(12) United States Patent
Strautmann

(10) Patent No.: US 9,221,612 B2
(45) Date of Patent: Dec. 29, 2015

(54) CONVEYING DEVICE AND/OR PRESS HAVING A FEED DEVICE CONNECTED UPSTREAM

(75) Inventor: Wolfgang Strautmann, Bad Laer (DE)

(73) Assignee: SIB Stratmann Ingenieurbuero GmbH, Glandorf (DE)

( * ) Notice: Subject to any disclaimer, the term of this patent is extended or adjusted under 35 U.S.C. 154(b) by 208 days.

(21) Appl. No.: 13/885,115

(22) PCT Filed: Oct. 31, 2011

(86) PCT No.: PCT/EP2011/069137
§ 371 (c)(1),
(2), (4) Date: Jul. 29, 2013

(87) PCT Pub. No.: WO2012/062617
PCT Pub. Date: May 18, 2012

(65) Prior Publication Data
US 2013/0299318 A1    Nov. 14, 2013

(30) Foreign Application Priority Data

Nov. 12, 2010 (DE) .......................... 10 2010 043 820
Dec. 14, 2010 (DE) .......................... 10 2010 063 049
Jun. 1, 2011 (DE) .......................... 10 2011 076 851

(51) Int. Cl.
| B30B 9/30 | (2006.01) |
| B65G 25/08 | (2006.01) |
| B02C 18/22 | (2006.01) |

(52) U.S. Cl.
CPC ............ B65G 25/08 (2013.01); B02C 18/2266 (2013.01); B02C 18/2275 (2013.01); B30B 9/301 (2013.01)

(58) Field of Classification Search
CPC ........... B65F 3/00; B65G 25/08; B30B 9/301; B02C 18/2275
USPC .......................................... 198/742; 241/224
See application file for complete search history.

(56) References Cited

U.S. PATENT DOCUMENTS 4,625,924 A * 12/1986 Killinger .................. 241/186.35
6,571,693 B1 * 6/2003 Kaldenberg et al. ............. 100/95
(Continued)

FOREIGN PATENT DOCUMENTS

| CH | GB 1357070 | * 6/1974 | ............... B65F 3/00 |
| DE | 2229764 | 1/1973 | |
(Continued)

OTHER PUBLICATIONS

International Preliminary Report.
(Continued)

*Primary Examiner* — Gene Crawford
*Assistant Examiner* — Thomas Randazzo
(74) *Attorney, Agent, or Firm* — Greer, Burns & Crain Ltd.

(57) ABSTRACT

A conveying device and/or press having a feed device connected upstream and having a feeding space for material to be pressed. A feeding space bottom is cylindrically bent and rises in a transfer region upstream of the conveying device. A conveying apparatus which can be pivoted to and fro by means of a drive is provided in the feeding space, a pivot axis of the conveying device coinciding with a virtual center axis of the cylindrical shape. At least one rotatably driven rotor roller is arranged adjacent to the transfer region to further convey or press the material. The conveying apparatus is a conveyor arm with a conveyor head, and in order to convey the limited quantities of the material to be pressed from a position in a lower region of the bottom upwards to the transfer region, the conveyor head can be moved to and fro over the bottom.

28 Claims, 18 Drawing Sheets

(56) References Cited

U.S. PATENT DOCUMENTS

| | | | |
|---|---|---|---|
| 8,733,682 B2 * | 5/2014 | Schiffer | 241/224 |
| 2010/0095857 A1 * | 4/2010 | Strautmann | 100/215 |

FOREIGN PATENT DOCUMENTS

| | | | | |
|---|---|---|---|---|
| DE | GB 1537659 | * 10/1979 | | B30B 9/30 |
| DE | 2926310 | 1/1981 | | |
| DE | 2944307 | 5/1981 | | |
| DE | 10221827 | 11/2003 | | |
| DE | WO 2008/113465 | * 9/2008 | | B30B 9/30 |
| EP | 0659659 | 6/1995 | | |
| EP | 1132138 | 9/2001 | | |
| GB | 1357070 | * 6/1974 | | B65F 3/00 |
| GB | 1537659 | * 10/1979 | | B30B 9/30 |
| WO | 2008113465 | 9/2008 | | |

OTHER PUBLICATIONS

ISR, Feb. 27, 2012.

* cited by examiner

CONVEYING DEVICE AND/OR PRESS HAVING A FEED DEVICE CONNECTED UPSTREAM

CROSS-REFERENCES TO RELATED APPLICATIONS

This application claims the benefit of the German patent application Nos. 102010043820.0 filed on Nov. 12, 2010, 102010063049.7 filed on Dec. 14, 2010, and 102011076851.3 filed Jun. 1, 2011, the entire disclosures of which are incorporated herein by way of reference.

BACKGROUND OF THE INVENTION

The present invention concerns a conveying device and/or press, especially a baling or a collection container with a feed device connected upstream with a feeding space for the pressing material, the bottom of the feeding space being bent in the form of an outer cylindrical section and rising into a transfer area in front of the conveying device and/or press, in which case a conveying device pivotable back and forth by means of a power drive is provided in the feeding space, whose pivot axis coincides with an imaginary center axis of the outer cylindrical section and in which a rotatable rotor roller or two parallel oppositely rotatable rotor rollers is/are arranged on the transfer area for further conveying and/or pressing of the pressing material.

A press with a feed device is known from WO2008/113465 A1, in which the press can be fed the pressing material from a feeding space by means of a feed device. A bottom of the feed space is bent in the form of an outer cylindrical section and the feed device is formed by a flat conveying shield pivotable in the feeding space by means of a power drive, whose pivot axis coincides with an imaginary center axis of the outer cylindrical section.

It is considered a drawback here that operational disturbances, especially clogging in a conveying device or press connected downstream of the feeding space, can easily occur, if the pressing material fed from the conveying shield cannot be further processed quickly enough by the conveying device and/or press. The pressing material is generally introduced manually to the feeding space so that relatively large fluctuations in the amount of pressing material that is situated in the feeding space occur here. An unduly large amount of pressing material in the feeding space can make reversal of the working direction of the conveying device and/or press necessary and/or require a high labor demand for manual removal of excess or already jammed and wedged pressing material so that needless hazards develop for the operating personnel and unproductive downtimes in the press. To remedy the problem either continuous observation and monitoring by a skilled operating person, who intervenes, as required, is necessary, or relatively costly technical devices must be provided with which the amount of pressing material fed to the conveying device and/or press is monitored and properly regulated, for example, by altering the stroke and/or pivot speed of the press shield, as required. In addition, in the flat conveying shield pressing material can collect behind the conveying shield and either contaminate the workplace, when the container is not closed or limit the conveying shield in its backstroke when the container is closed, and lead to jamming of the conveying shield.

A waste container is known from DE 78 10 147 U1 in which the press in the form of a press piston pivotable on a pivot arm in the feeding space is designed with a triangular cross section. The press piston slides along a bottom of the feeding space, in which case the bottom is curved according to the outside radius of the pivotable press piston. The pressing material can therefore be conveyed through a passage from the feeding space into the actual internal space of the container. The passage is then arranged at the lowest area of the bottom of the feeding space. Pressing of the pressing material occurs only through the pivotable press piston.

It is considered a shortcoming in this waste container that disturbances during the pressing process can easily occur, if a larger amount of pressing material, especially of the bulky type, like cardboard packaging, is situated in the feeding space. In this case the pressing material can become congested in front of the passage so that the press piston is no longer capable of completely executing its pivot movement, i.e., up to the reversal point on the container side. In such cases excess pressing material must be removed manually from the feeding space with the press piston disengaged, which is costly and can even be hazardous and through which unproductive downtimes are produced. In addition the compaction attainable with the press piston of the pressing material is very limited, which no longer satisfies the present demands for the highest possible compaction.

The task is therefore posed for the present invention to devise a conveying device and/or press with a feed device connected upstream of the type just mentioned, which eliminates the shortcomings mentioned above and which guarantees in a technically simple design reliable operation free of disturbance, especially feed of the pressing material that avoids clogging and downtimes.

SUMMARY OF THE INVENTION

The solution to this task is possible according to the invention with a conveying device and/or press with a feed device connected upstream of the type just mentioned, which is characterized by the fact that the conveying device is a conveying arm with a conveying head that is movable back and forth for conveying the pressing material in limited amount from a position in the lower area of the bottom upward to the transfer area of the conveying head above the bottom.

With the invention a conveying device and/or press with a feed device connected upstream is created in which clogging of the conveying device and/or press is effectively avoided by the bottom rising toward the transfer area of the pressing material and by the use of the conveying arm with the conveying head. This is achieved in that, in the first place, part of the pressing material falls back into the feeding space beyond the conveying head during a forward movement of the conveying arm with the conveying head in the direction upward toward the transfer area and that in the second place during back movement of the lever from the transfer area downward the pressing material still not seized by the rotor roller or rotor rollers automatically falls or slides back to the lowest point of the curved bottom because of its own weight. The invention therefore offers two advantages, namely that only a limited amount of pressing material is always transported into the transfer area and that no excess pressing material remains in the material transfer area. Consequently, clogging and/or overloading of the following driven elements of the conveying device and/or press can no longer occur. The maximum supplied amount of pressing material is limited because the effective conveying surface of the conveying head of the conveying arm has a limited size, which is smaller than, say, the surface of a conveying shield known from the prior art. Excess pressing material automatically falls or slides back downward again from the pressed material transfer area over the conveying head. Unproductive downtimes of the conveying device and/or press and demanding, and under some circumstances hazardous, manual removal of the press material from the pressed material transfer area for elimination of clogging are effectively avoided.

The feeding space is formed for example by a box with preferably metal walls and has an opening on the top for charging of the pressing material, like cardboard packaging or empty plastic bottles. A first compaction of the material being pressure already occurs through the feed device, the material then being further compressed by the downstream components.

For the desired limited conveying effect of the conveying head of the conveying arm it has proven to be a favorable configuration if, viewed in the radial direction of the conveying arm, the conveying head has a height starting from the bottom that extends over a maximum of 25%, preferably 10 to 20% of the radius of the conveying arm. In relation to the radius of the conveying arm the height of the conveying head that exerts a conveying effect on the pressing material is therefore relatively small. A sufficiently large and sufficiently reliable conveying effect is guaranteed in such a low conveying head. The radius of the conveying arm is considered to be the spacing from its pivot axis to the bottom of the conveying head facing the bottom of the feeding space.

To achieve the desired conveying effect of the conveying arm the angle over which the conveying arm can be swiveled is expediently between 60 and 180°, preferably between 90 and 150°. It is guaranteed with a pivot angle within this pivot angle range that the conveying arm with the conveying head spans a sufficiently large pivot angle both in the conveyance direction from the lowest area of the feeding space upward to the transfer area and also opposite the direction of conveyance from the lowest area of the feeding space away from the transfer area and specifically both to convey the pressing material to the transfer area and also for reliable transfer of the pressing material from the back of the conveying head to its front. The optimal pivot angle to be used in the individual case is guided according to the design of the feeding space and the conveying arm in detail and according to the properties of the material to be processed.

In order to reliably achieve the desired falling back or sliding back of the material still not seized by the rotor roller or rotor rollers during pivoting of the conveying arm away from the transfer area, the bottom of the feeding space preferably has a slope angle α between 25 and 90°, preferably between 45 and 65° to the horizontal in the transfer area directly in front of the rotor roller or rotor rollers.

A modification proposes that the conveying head of the conveying arm be designed with a back facing away from the direction of conveyance at a flat obtuse angle β obliquely to the bottom. With this configuration of the conveying arm a situation is achieved in which during movement of the conveying arm opposite its direction of conveyance to the rear reversal point, i.e., the point facing away from the transfer area, the conveying head passes or travels beneath the pressing material lying at the bottom in the container. The pressing material, which is initially situated on the back of the conveying head is then moved above the conveying head and transported to the front of the conveying head in order to be then conveyed to the transfer area with the next lever stroke in the feed direction. It is further proposed that the conveying head of the conveying arm be designed with its front facing in the feed direction to the transfer area and at right angles to the bottom. With this configuration of the conveying arm and its conveying head a situation is achieved in which the conveying head conveys sufficient but not unduly large amounts of pressing material reliably to the transfer area in the feed direction. "At a right angle" here should be understood to mean at an angle of 90±20°.

A further embodiment proposes that the conveying head of the conveying arm carries drivers on a front facing the feed direction to the transfer area, which can be swiveled passively by a pivot axis behind it running parallel to the front. By means of the passively pivotable drivers the surface of the front of the conveying head active for conveying the pressing material is automatically increased in size during movement in the feed direction, in which the product being pressed in the feeding space is forced against the drivers and they are swiveled upward on this account. During the reverse movement of the conveying head the drivers fall back by their own weight so that during backward movement of the conveying head they do not hamper transfer of pressing material over the conveying head.

A modification in this respect proposes that the drivers be designed as vertically aligned triangular plates or elements with acute angles in their basic shape, in which their pivot axis passes through the sharp rear corner of the triangle and in which a front upper corner is designed with at least one tooth protruding above the conveying head. Owing to the stated shape of the drivers, during the backward movement they disappear almost completely within the conveying head. The tooth ensures good engagement between the pressing material and the drivers during the conveying movement of the conveying head so that the drivers are reliably tilted out when they encounter the pressing material.

During the pivot movement of the conveying arm its conveying head is guided over the bottom with the smallest possible spacing; however, it can happen that between the bottom of the conveying head of the conveying arm and the bottom of the feeding space flat pressing material is jammed, which can lead to difficult movement or in the extreme case blocking of the conveying arm. This flat pressing material also stays put and is not conveyed by the conveying head of the conveying arm to the transfer area. In order to remedy or prevent this problem it is proposed that the bottom of the feeding space have parallel ribs on its top, which run in the movement direction of the conveying arm. The spacing of the ribs is guided according to the surface dimensions of the material being processed and is expediently chosen so that the pressing material at least for the most part does not fit between two adjacent ribs but lies on the ribs. The ribs can be molded in one piece on the bottom or mounted separately. The pressing material is held by means of ribs in a position somewhat spaced from the actual bottom, which ensures reliable seizing of the material by the conveying head.

For further improvement of the conveying effect of the conveying head conveying prongs that engage between the ribs can be arranged on the front of the conveying head. The conveying prongs can have different width depending on the properties of the pressing material, maximally the width of the intermediate space between two adjacent ribs, and be made from different material, for example, from plastic or metal, like steel.

It is then preferably further proposed that the conveying prongs be articulated with the conveying head. During back movement of the conveying head these conveying prongs are forced forward and above by flat material lying on the bottom and thus allow the pressing material to pass underneath. During forward movement of the conveying head these prongs, if they encounter the pressing material, are swiveled rearward and downward, expediently against a stop, and then reliably push the seized material in front of them to the transfer area.

A particularly effective conveying of flat material by the conveying prongs is achieved if each rib is assigned a pair of two conveying prongs of the conveying head which run on both sides of the rib.

The conveying prongs are expediently designed as fingers connected individually to the conveying head or as a prong comb connected to the conveying head. In the first variant individual conveying prongs can be replaced, as required; in the second variant mounting and removal of conveying prongs is simplified by their combining in one component.

If pressing material, which also contains crumbly fractions, is to be processed, it is expedient that a brush or roll of several brushes be arranged on the front of the conveying head. During the pivot movement of the conveying arm the brush or roll of brushes sweeps the bottom of the feeding space and thus also conveys small-sized material to the transfer area. There is then a possibility that a brush is arranged on each conveying prong. Replacement of brushes together with the conveying prongs can then occur quickly, as required. If the conveying prongs are arranged articulated, especially pivotable, on the conveying head, the brushes make the pivot movement of the conveying prongs and only sweep over the bottom of the feeding space during forward movement of the conveying arm, whereas during the backward movement they bypass the small or crumbly product being pressed.

Since different materials to be processed have different properties it is advantageous if the conveying head is adjustable to different pressing material. For this purpose the invention proposes that the front of the conveying head be adjustable in height. The amount of material conveyed to the transfer area can be controlled not only by the pivot frequency or speed of the conveying arm but also by the surface size of the conveying head.

In another embodiment the conveying head is preferably designed as a hollow element with triangular cross section, in which the front of the conveying head consists of two wall parts lying one on the other, movable in their height direction relative to each other and fastenable relative to each other. The height of the front of the conveying head can therefore be adjusted as required. In this case the front of a rear wall forming the conveying head is then expediently connected to one wall part and the front of a lower wall forming the bottom of the conveying head is connected to the other wall part or designed in one piece. On its end away from the wall parts on the front the rear wall and the lower wall are expediently articulated to each other or flexible. With any adjusted height of its front the conveying head therefore retains its triangular shape and cross section without protruding edges that interfere with the function.

In order to reliably transport pressing material from the back of the conveying arm to the front of the conveying arm it is additionally proposed that the bottom, bent in the form of an outer cylindrical section on its end away from the transfer area, grade into a material return arc, bent more strongly in the same direction and beyond the vertical. This achieves a situation in which the pressing material is transported, so to speak, "overhead" from the back to the front of the conveying arm when the conveying arm is moved into the area of the reversal point of its pivot movement away from the transfer area.

A further embodiment proposes that a material delivery table be connected upstream of the feeding space on its side away from the transfer area, via whose surface the pressing material can be pushed into the feeding space. The material delivery table increases the reliability of operation, since the material delivery table ensures that the operating personnel necessarily maintain a certain distance from the moving parts, especially the conveying arm. At the same time the material delivery table facilitates supply of the feed device with pressing material, since the operating person in a first step positions the pressing material on the material delivery table and only then conveys it into the feeding space by advance on the material delivery table.

Another expedient to increase operating safety of the operating personnel consists of the fact that the bottom of the feeding space is preferably designed in an area adjacent to the material delivery table with a bottom part pivotable parallel to the conveying arm, in which the bottom part blocks the material delivery table to the feeding space and the conveying arm, when the position of the conveying arm extends above the material delivery table, and when the conveying arm is situated beneath the material delivery table, it releases the material delivery table to the feeding space. By means of the pivotable bottom part it is guaranteed with particularly high safety that an operating person cannot come into hazardous contact with the conveying arm, even if the conveying arm has a large pivot angle extending beyond the height of the material delivery table. At the same time, the pivotable bottom part prevents insertion of pressing material at the moment at which the conveying arm is situated right in front of the material delivery table so that a hazard to operating personnel from sudden movement, especially raising of the pressing material by its contact with the moving conveying arm, is avoided.

In order to keep the mechanical design as simple as possible, it is further proposed that the pivotable bottom part be drivable within its pivot range by the pivot lever. An active drive device for pivoting of the bottom part is advantageously not required. It is sufficient to mount the bottom part pivotable within a sufficient pivot angle relative to the remaining bottom. Movement of bottom part is taken over by the conveying arm, preferably by correspondingly arranged drivers.

As an alternative to the pivotable bottom part described above, the invention proposes that the material delivery table have a table extension in the direction toward the feeding space, which can be swiveled around a pivot axis that runs along a front edge of the delivery table. When the conveying arm is situated in a position away from the material delivery table, the table extension expediently runs as an extension of the material delivery table further in the direction toward the feeding space. When the conveying arm approaches the material delivery table, the table extension is swiveled upward in order to protect operating personnel from the conveying arm.

For the purpose of simple activation of the pivotable table extension it is preferably prescribed that by the conveying arm during its pivot movement in the area of its rear reversal point the table extension can be swiveled by contact with the conveying arm or with the conveying head.

The invention also proposes that the table extension have a width measured parallel to its pivot axis that is smaller than the distance measured in the same direction between the pivot arms of the conveying arm and that the table extension in a lower range of its pivoting extends with its free side between the pivot arms and lies on the conveying head. In this variant the free side of the table extension advantageously acts as a pusher, which pushes the pressing material forward, situated on the top of the conveying head during pivoting back of the conveying arm and conveys it in front of the front side of the conveying head. In this way the height of the rear edge of the feeding space can be reduced, which facilitates manual introduction of pressing material.

The table extension acquires an additional function in an embodiment in which it is proposed that the table extension describe a bend on the bottom or has a curved section pivotable relative to the remaining table extension and that when the table extension is swiveled upward it or its curved section continues the bottom bent in the form of an outer cylindrical section on its end facing away from the transfer area into a material return bend bent more strongly in the same direction and beyond the vertical. Transport of the pressing material overhead from the back to the front of the conveying arm is supported by this, when the conveying arm is moved into the area of the reversal point of its pivot movement away from the transfer area.

The conveying arm can be driven differently. In a preferred embodiment a linearly oscillating power drive is provided as power drive of the conveying arm, in which a mobile end of the power drive, especially a piston rod of a piston-cylinder unit, is articulated directly or via a transmission angle lever with a pivot lever of the conveying arm. The piston-cylinder unit can include one or more pneumatic or hydraulic cylinders that are mounted on one end on the box of the feeding space and whose other end is joined to the mentioned pivot lever or transmission angle lever of the conveying arm for its pivoting.

As mentioned above, the conveying device and/or press according to the invention has one or two rotor rollers. These can be rotated with a power drive, especially an electric or hydraulic motor, in order to convey the pressing material fed by the conveying arm from the transfer area into the container interior of a corresponding collection container or into the press chamber of the corresponding press. In this case a first preliminary pressing of the pressing material already occurs by the feed device and the pressing material can then be further compacted and/or ground by the rotor roller or rotor rollers. Each rotor roller is preferably assigned a stripper, which can be mounted to pivot and which strips off with its prongs the material from the teeth of the rotor roller into the container interior or into the press chamber.

In order to improve the transition of the material from the transfer area into the effect area of the rotor roller or rotor rollers, it is proposed that on an end of the bottom facing the transfer area a feed roller running parallel to the rotor roller or to the two parallel rotor rollers be arranged. The rotary drive of the feed roller is expediently coupled to the rotary drive of the rotor roller or rotor rollers. The direction of rotation of the feed roller is such that pressing material coming in contact with the feed roller is conveyed in the direction toward the single rotor roller or the next of the two rotor rollers. If only rotor roller is present, this cooperates in known fashion with a slide and guide plate, in which case conveyance of the pressing material occurs between the outer periphery of the rotor roller and the surface of the slide and guide plate facing it. If two parallel rotor rollers are present, conveying of the pressing material occurs between the oppositely rotating rollers.

A further embodiment of the conveying device and/or press is characterized by the fact that the feed device forms a separate unit, which can be connected via releasable connection devices to the rest of the conveying device and/or press or to a baling press or a collection vessel and can be separated from it. The feed device and the conveying device and/or press can also together form an assembly. The feed device alone or together with the conveying device and/or press can then be arranged fixed and remain where the pressing material and collected occurs, whereas a collection vessel is replaceable and can be transported away. The collection vessel can be designed in known fashion as a transport container, which is taken up by a truck, transported, emptied by tilting and can be lifted. The conveying device and/or press is thus continuously available and need not be transported together with the container. The conveying device and/or press can also be arranged after a known baling press.

As an alternative the feed device can be integrated together with the conveying device and/or press with a baling press or collection vessel and firmly connected to it.

BRIEF DESCRIPTION OF THE DRAWINGS

Practical examples of the invention are explained below with reference to a drawing. The figures of the drawing show.

DETAILED DESCRIPTION OF THE PREFERRED EMBODIMENTS

Figure 1:
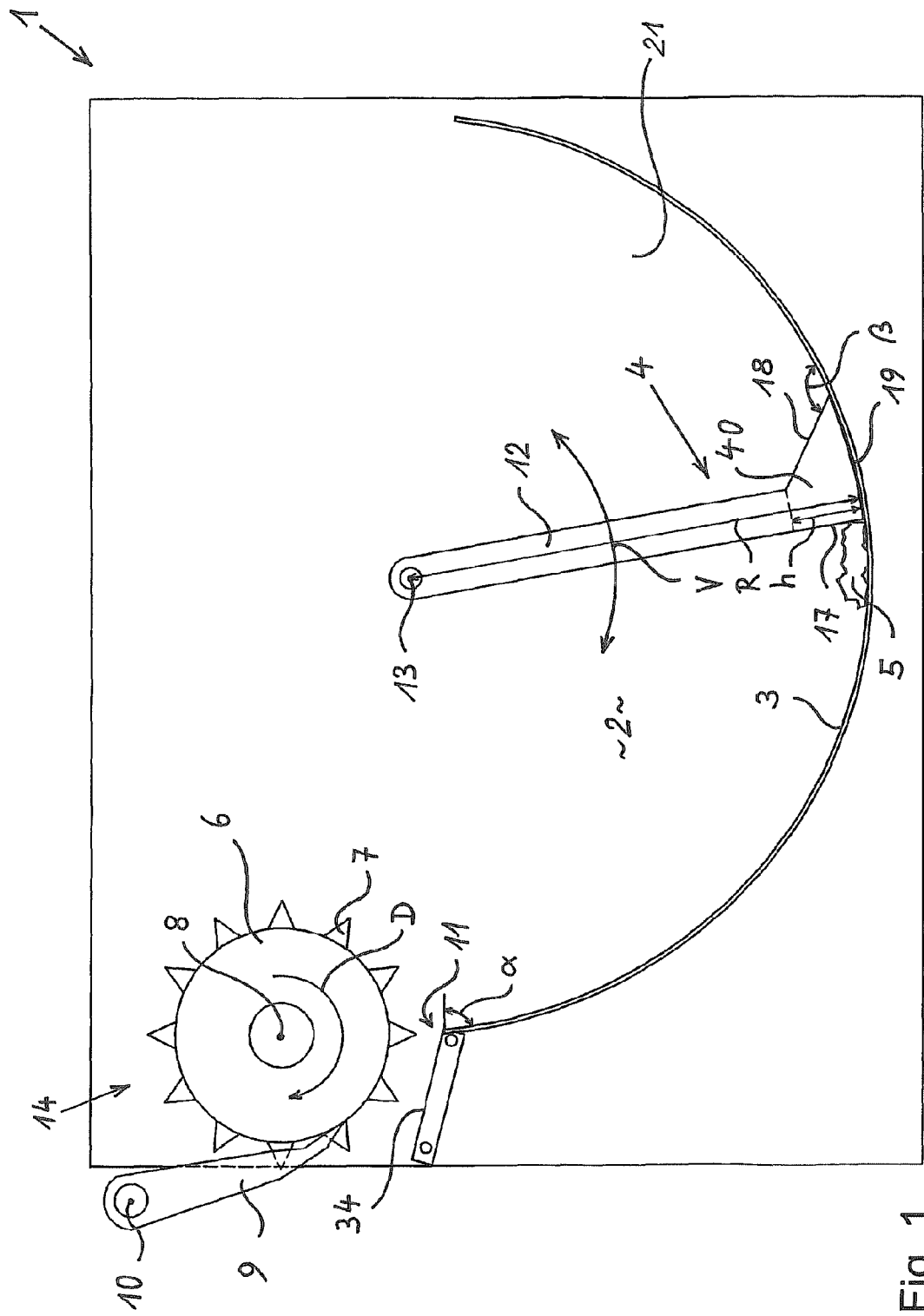
FIG. 1 A conveying device and/or press with a feed device connected upstream, with a conveying arm in a first position in a vertical section, FIG. 2 the feed device from FIG. 1 with a conveying device in a second position in a vertical section, FIG. 3 an additional embodiment of the feed device in a vertical section, FIG. 4 a collection vessel and a press and feed device, for connection to each other in a perspective view, FIG. 5 the conveying device and/or press with feed device connected upstream in an altered version in perspective view obliquely from above, FIG. 5*a* the conveying device and/or press with feed device connected upstream from FIG. 5 with a conveying arm in a first position in a vertical section, FIG. 5*b* the conveying device and/or press with feed device connected upstream from FIG. 5 with the conveying arm in the second position in a vertical section, FIG. 6 the feed device in an additional variant, in a view obliquely from above, FIG. 7 the feed device from FIG. 6 together with a conveying device in a vertical section, FIG. 8 the feed device with conveying device and a baling press connected downstream in a vertical section, FIG. 9 the cutout framed in FIG. 8 in an enlarged view, FIG. 10 a feed device with conveying device and the baling press in a view obliquely from above, FIG. 11 the feed device in an additional variant in a perspective view obliquely from above in a partially broken down view, FIG. 12 a cutout of the feed device from FIG. 11 in a vertical section, FIG. 13 an additional cutout of the feed device in a vertical section together with an enlarged detail in a first operating position, FIG. 14 the cutout of the feed device from FIG. 13 together with an enlarged detail in a second operating position, FIG. 15 the feed device in an additional variant together with a feed device in a vertical cross section in a first operating position and FIG. 16 the feed device from FIG. 15 in the same view in a second operating position.

The same parts in the figures of the drawing are provided with the same reference numbers so that not each reference number is explained in each drawing figure.

Figure 2:
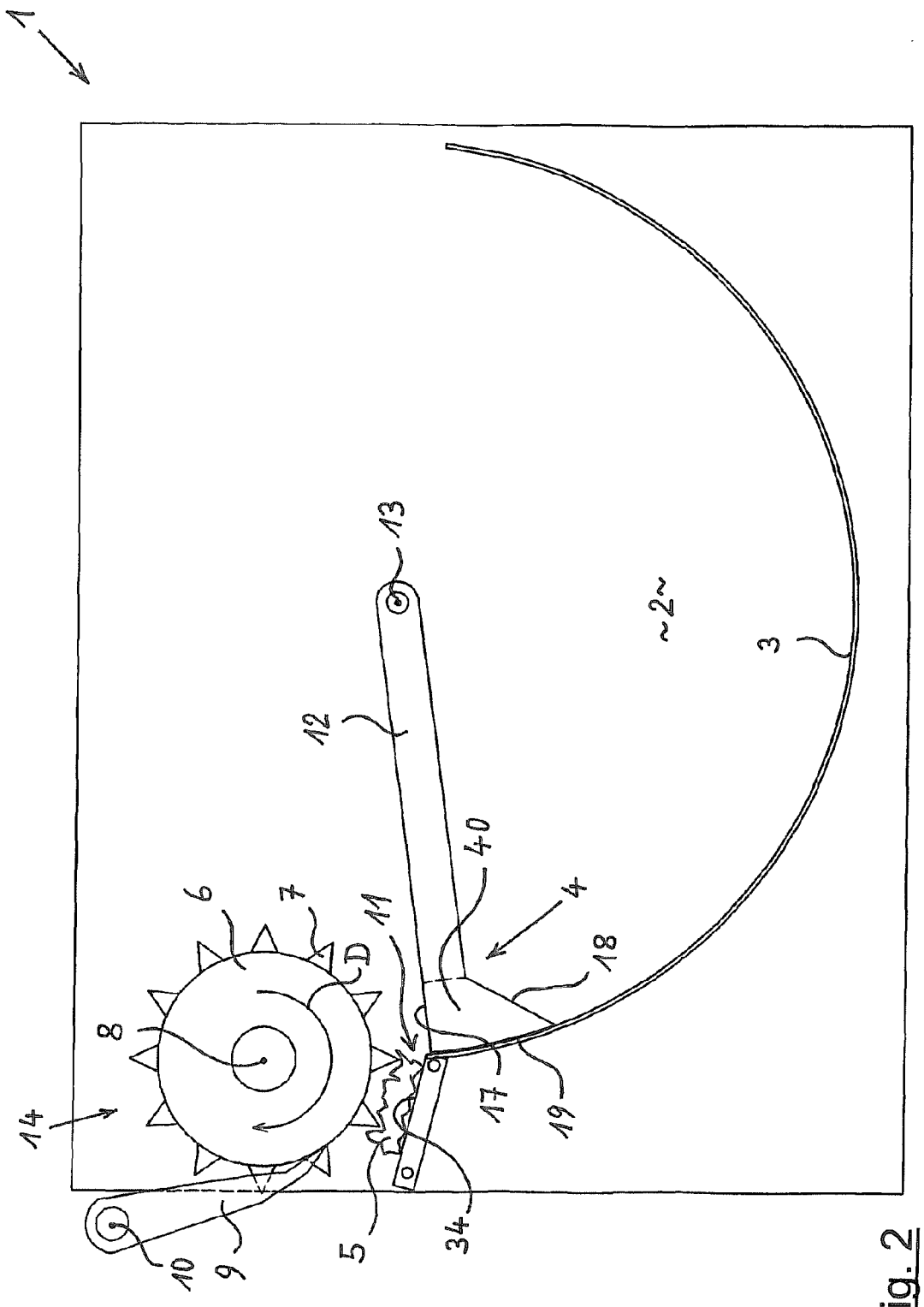

FIGS. 1 and 2 of the drawing show in cross section a conveying device and/or press 14 of a collection container, especially a waste container or a baling press, in which the collection container of the baling press are not shown here. The conveying device and/or press 14 has a feed device 1 connected upstream, which is shown in FIGS. 1 and 2 in two different operating states. A feeding space 2 is formed by side walls 21, only one of which is visible here in the background, and a bottom 3. The feeding space 2 is open on the top or provided with a mountable flap in order to be able to fill the pressing material 5, like empty plastic bottles or cardboard packaging.

The bottom 3 is curved according to an outer cylindrical surface in which the imaginary center axis of the cylinder coincides with a pivot axis 13 of a conveying arm. The bottom 3 then extends over about a half circle, which is open on the top. The conveying arm 4 therefore always moves parallel along bottom 3. The conveying arm 4 is preferably swiveled back and forth by a power drive not shown here, like a hydraulic cylinder of electric motor, as indicated by the double arrow V. The conveying arm 4 has a conveying head 40 and one or more (here two) lever arms 12, which run parallel to the two side walls 21 right in front of them. The pressing material 5 is fed with the conveying arm 4 and its conveying head 40 from a position in the lower area of bottom 3, as shown in FIG. 1, to a material transfer area 11 as is apparent from FIG. 2. The lever arms 12 do not themselves participate in conveying the pressing material 5, but only support the conveying head 40.

In the material transfer area 11 the pressing material 5 is seized by the preferably replaceable teeth 7 of a rotor roller 6, which has a working direction of rotation D and which forms part of the corresponding conveying device and/or press 14 and optionally grinds it and further compacts it and feeds it via a slide and guide plate 34 to the actual container interior of the collection container arranged downstream or to the press chamber of the baling press arranged downstream. The rotor roller 6 is also rotated by means of a power drive, like an electric or hydraulic motor, around its axis of rotation 8. The direction of rotation can be switched, for example, for cleaning and maintenance purposes.

The rotor roller 6 is assigned a stripper 9 in order to strip off with its prongs any material 5 adhering to the teeth 7 into the collection interior or into the press chamber. The stripper 9 can then be mounted to pivot around a pivot axis 10 and be provided with a pivot drive in order to convey the pressing material 5 with the rotor roller 6 stopped into the downstream container interior or into the downstream press chamber and to compact it.

The conveying head 40 of the conveying arm 4 has a front 17 facing the rotor roller 6, which runs at a right angle or roughly a right angle, i.e., under an angle of 90±20° to bottom 3 and a back 18 facing away from rotor roller 6, which runs under a flat obtuse angle β to bottom 3. In the radial direction of the conveying arm 4 the conveying head 40 has a height h starting from bottom 3, which extends over a maximum of 25%, preferably 10 to 20% of the radius R of the conveying arm 4; in the depicted practical example the value is about 15%. The radius R of the conveying arm 4 is measured from its pivot axis 13 to the bottom 19 of the conveying head 40 facing bottom 3.

Radially inward from the conveying head 40 the space between the lever arms 12 is free. The length of the conveying head 40 measured perpendicular to the plane of the drawing of FIGS. 1 and 2 expediently corresponds to the length of rotor roller 6 measured in the same direction.

If the conveying arm 4 is situated in its front end position depicted in FIG. 2, the front 17 of the conveying head 40 forms an enlargement of the transfer area 11 and simultaneously bounds it downward. In the transfer area 11 the pressing material 5 can now be effectively seized by the rotor roller 6. Excess material falls beyond the conveying head 40 between the lever arms 12 back into the lowest area of the feeding space 2.

If the conveying arm 4 moves opposite the feed direction from the position in transfer area 11 close to rotor roller 6, as in FIG. 2, back into a swiveled back position as in FIG. 1, any material 5 still not seized by the rotor roller 6 and still present in the transfer area 11 slides under gravity automatically back to the lowest point of the bottom 3 of the feeding space 2 with the shape of a cylindrical surface. Owing to the fact that the bottom 3 rises to the transfer area 11, the situation is avoided in which the conveying device and/or press 14, here specifically with rotor roller 6, is supplied an unduly large amount of pressing material 5. Clogging or overloading is therefore effectively suppressed. Since the bottom 3 describes roughly a semicircle here, the maximum pivot angle of the pivot lever 4 can amount to about 180° here. Depending on the design of bottom 3 and the conveying arm 4 in detail and depending on the material to be processed, the pivot angle can also be less than 100°. The angle over which the conveying arm 4 can be swiveled is preferably between 60 and 180°, with particular preference between 90 and 150°.

Figure 3:
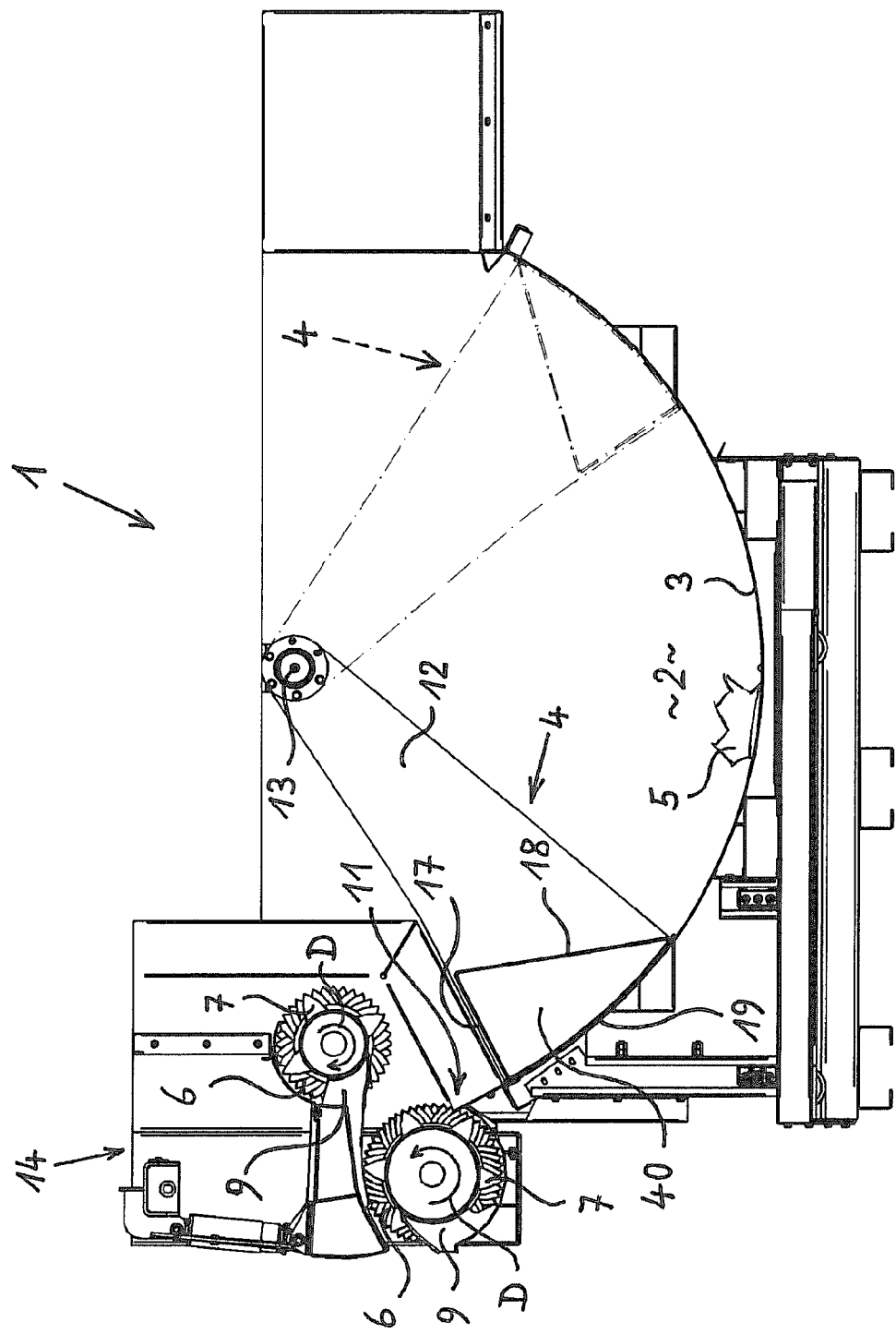

A further embodiment is depicted in FIG. 3, in which the conveying device and/or press 14 here includes two rotor rollers 6, oppositely driven preferably by a common power drive each with a working direction of rotation D shown by an arrow. Because of this the conveying and pressing output is increased, since the pressing material 5 is conveyed between the two rotor rollers 6, to each of which a stripper 9 is assigned, into the container interior of the downstream collection container (not shown here) or into the press chamber of the downstream baling press.

Figure 4:
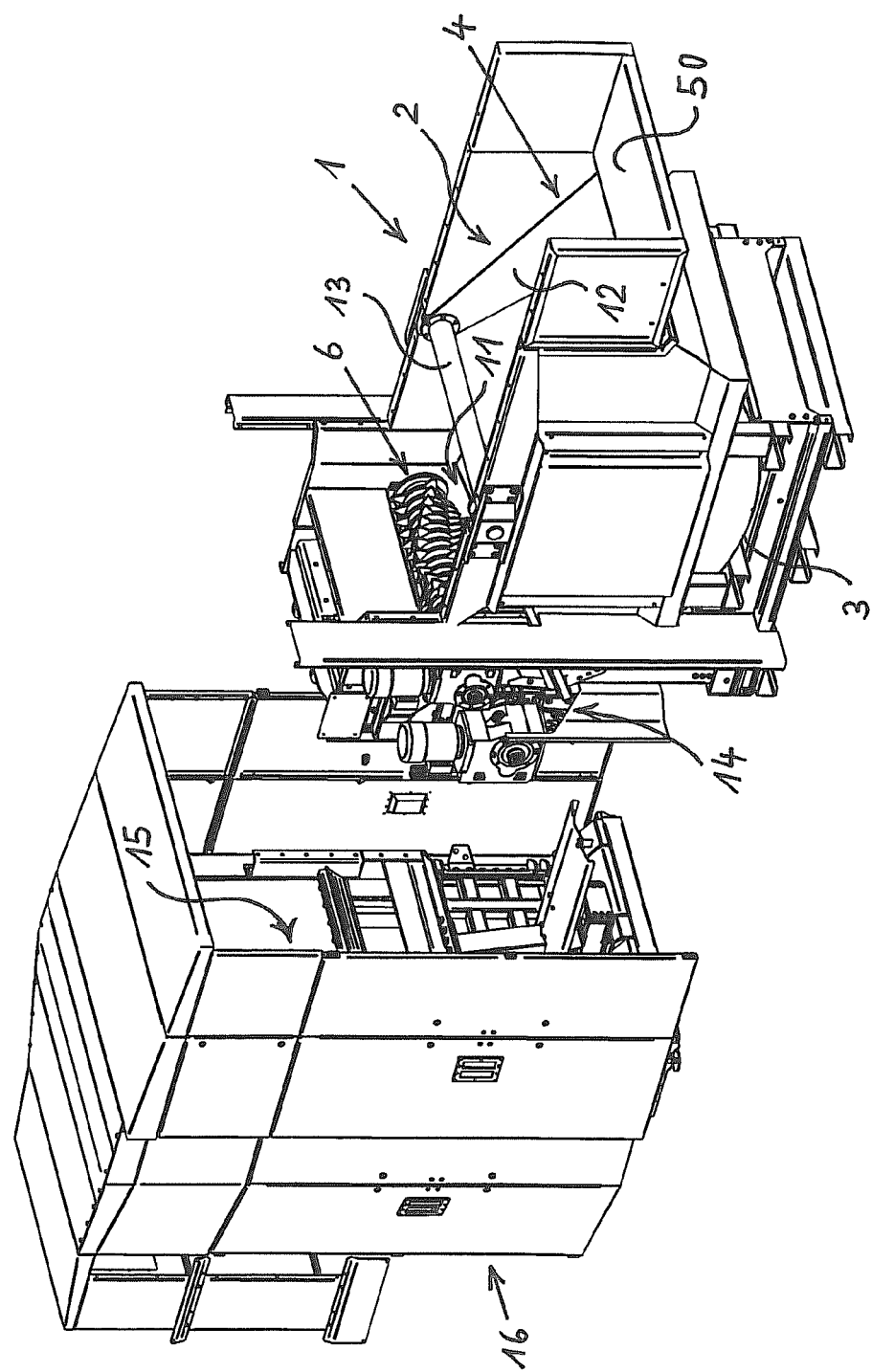

A feed device 1 together with a conveying device and/or press 14 and a collection container 16 are apparent overall from FIG. 4. The collection container 16 consists, for example, of metal wall elements in order to form the actual container interior 15 for the pressing material 5. The conveying device and/or press 14 with the at least one rotor roller 6 is detachable from it. To feed the pressing material 5 to the conveying device and/or press 14 the feed device 1 is used with the conveying arm 4 pivotable in the feeding space 2, as already described above. On the side of the feed device 1 facing away from the conveying device and/or press 14 a material delivery table 50 is arranged, on which an operating person can position the pressing material and then push it into the interior of the feeding space 2.

The feed device 1, on the one hand, and the collection container 16, on the other hand, are still not connected to each other in FIG. 4. In the connected state the conveying device and/or press 14 lies directly in front of or in the opening of the container interior 15 of the collection container 16. The collection container 16 can be a transportable container which is supplied for emptying to a recycling installation or landfill and then transported back and can be connected again to the feed device 1 and the conveying device and/or press 14.

The box forming the feeding space 2 is either rigidly connected to the conveying device and/or press 14 or designed separable from it in order to remove it and use it with another conveying device and/or press. The conveying device and/or press 14 and the feeding space 2 can also form with conveying arm 4 a common unit, which is firmly or releasably connected to the collection container 16.

Figure 5:
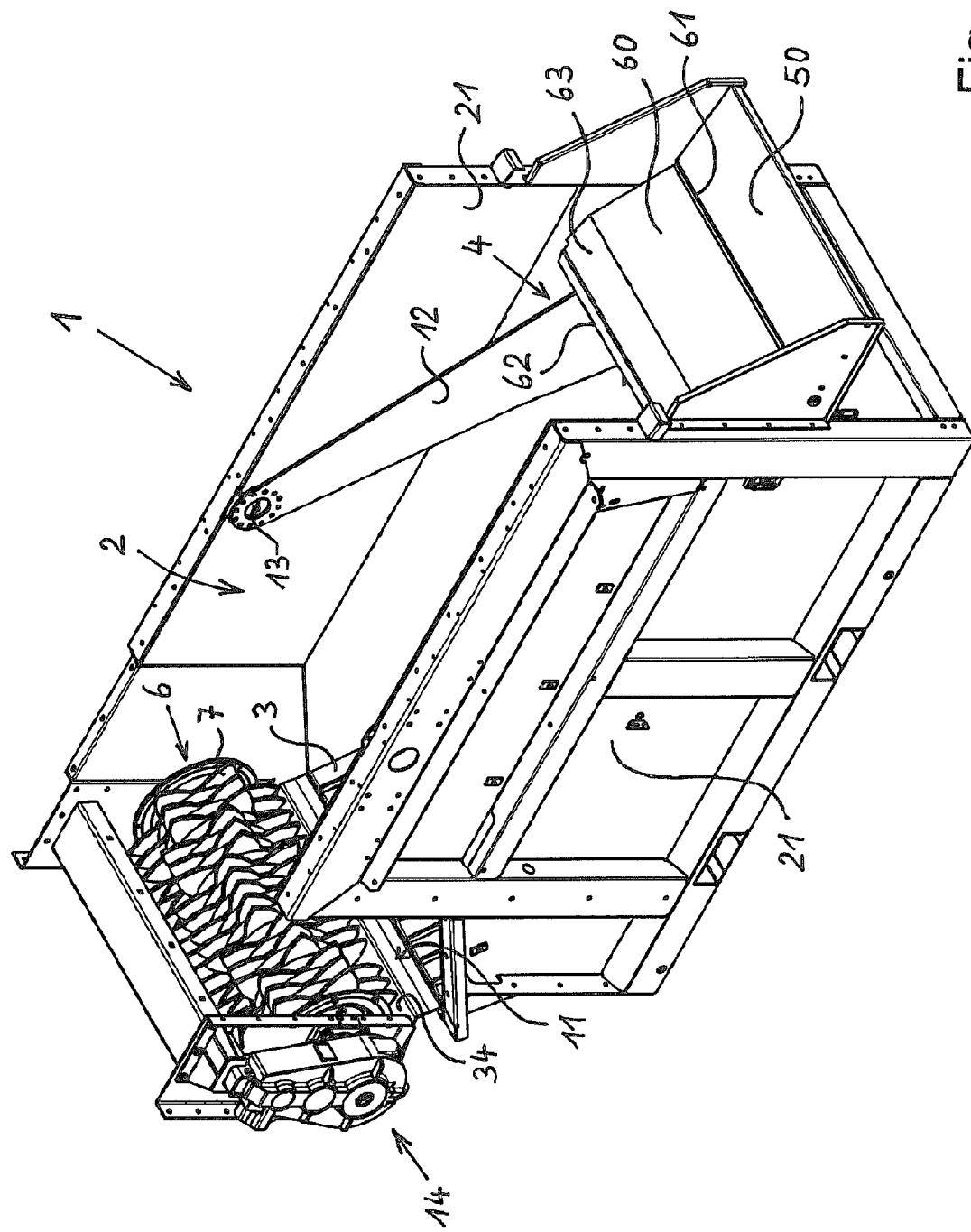

FIG. 5 shows in a view obliquely from the top and additional practical example of feed device 1 together with a conveying device and/or press 14. The feed device 1 here also has a feeding space 2, which is formed by two side walls 21 and a largely covered bottom 3 bent in the form of an outer cylindrical surface section. On the side of the feed device 1 to the left in FIG. 5 the conveying device and/or press 14 is arranged with the transfer area 11 lying in front of it. The conveying device and/or press 15 is formed here by a rotatable rotor roller 6 with a number of radially protruding teeth 7. The slide and guide plate 34 lies beneath the rotor roller 6.

The conveying arm 4 is arranged pivotable in feeding space 2 around the horizontally running pivot axis 13, in which case only one of the lever arms 12 of the conveying arm 4 is visible here. The corresponding pivot drive of the conveying arm 4 is not shown in FIG. 5.

A material delivery table 50 is arranged on the right end of the feed device 1 in FIG. 5, which extends over the entire width of the front of the feed device 1 and is aligned essentially horizontally. In the direction toward feeding space 2 a table extension 60 is connected to the delivery table 50, which is also plate-like and is connected pivotable with the material delivery table 50 around a pivot axis 61. On the side facing the feeding space 2 the table extension 60 grades into a curved section 63 which is again articulated with the rest of the table extension 60. With a free side 62 the table extension 60 extends into the feeding space 2 in front of and between the lever arms 12 and the conveying arm 4. Pivoting of the table extension 60 occurs through the conveying arm 4 when it is situated in the area of its rear reversal point, as shown in FIG. 5.

Figure 5A:
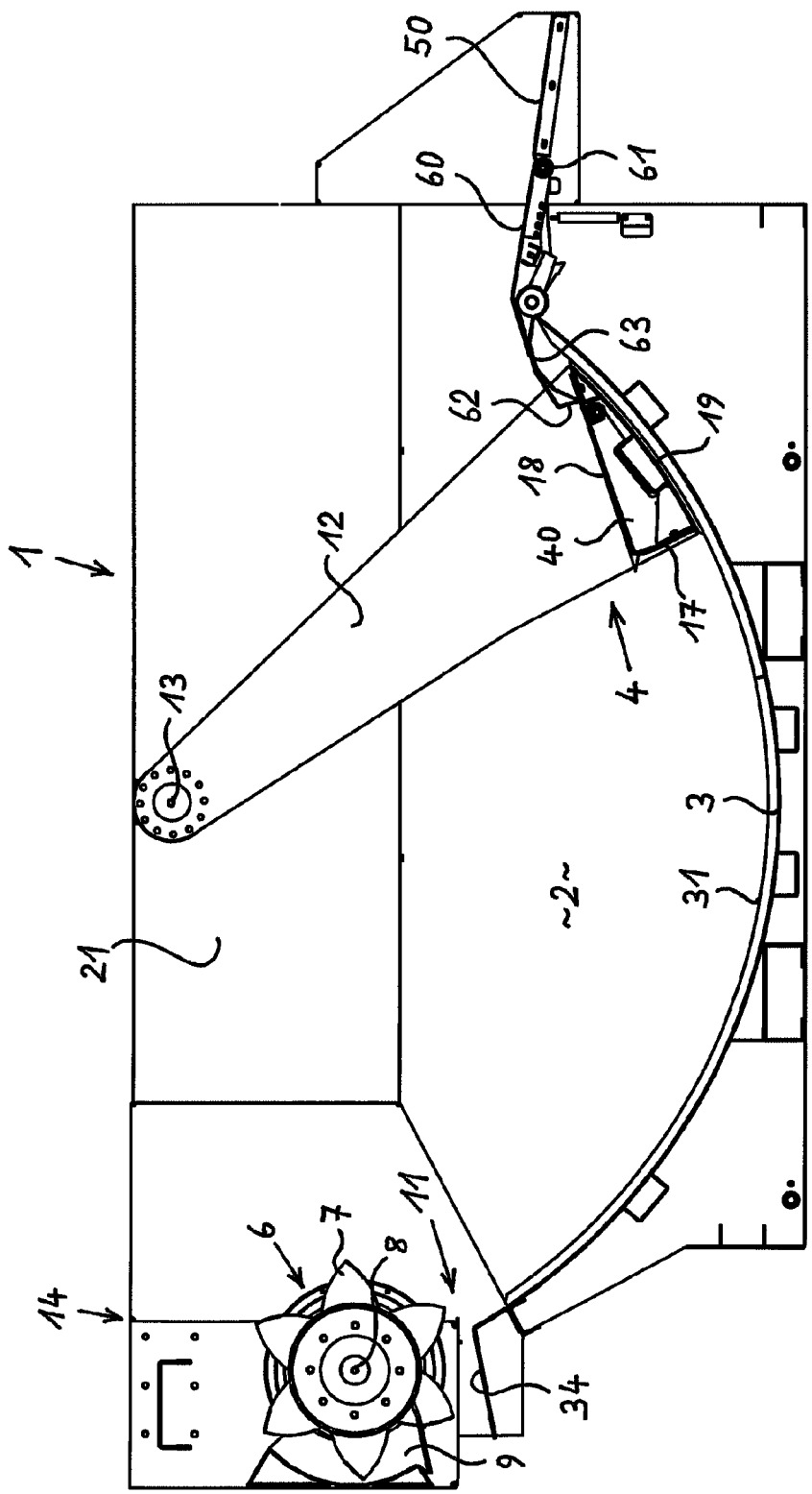
Figure 5B:
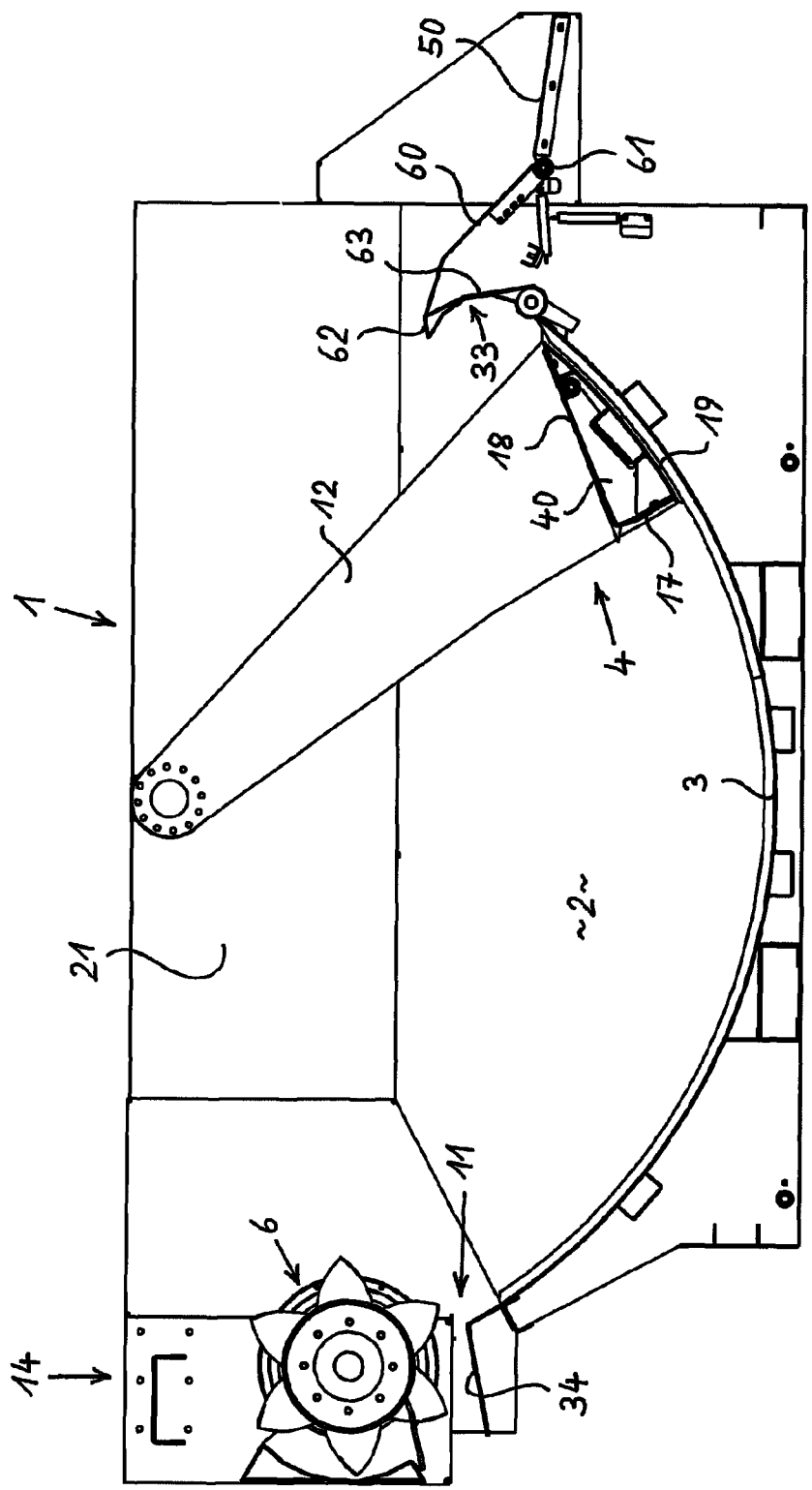

FIGS. 5a and 5b show the feed device 1 in FIG. 4 in a vertical section in two different operating positions.

In FIG. 5a the conveying arm 4 with its conveying head 40 is approaching the rear reversal point of its pivot movement but has still not reached it. In this operating position the free side 62 of the curved section 63 of the table extension 60 extends between the lever arms 12 and the conveying arm 4 and lies on the upward facing back 18 of the conveying head 40. On further movement of the conveying arm 4 in the direction toward the rear reversal point, i.e., counterclockwise in FIG. 5, the conveying head 40 is moved further in the direction toward table extension 60 so that its free side 62 is moved relative to the conveying head 40 further above its back 18 in the direction toward front 17 of the conveying head 40. Because of this the free side 62 of the table extension 60 acts as a pusher and pushes the pressing material over the conveying head 40 to its front 17.

In FIG. 5b the conveying arm 4 has almost reached its rear reversal point. In this operating position the conveying head 40 by means of a mechanical coupling forces the pivotable table extension 60 upward with the curved section 63 pivotable for this purpose. Because of this the part of the table extension 60 connected to the material delivery table 50 comes into a position running obliquely upward in which additional introduction of material from material delivery table 50 into feeding space 2 is no longer possible. At the same time the curved section 63 initially lying beneath the table extension 60 is shifted in a roughly vertical direction so that the free side 62 of the table extension 60 now faces upward. The side of the curved section 63 facing the feeding space 2 now forms a material return bend 33 in the same direction as the bottom 3 but bent more strongly beyond the vertical. Pressing material pushed by the conveying head 40 in the direction toward this material return bend 33 is diverted here in the direction toward the feeding space 2 and then falls under the influence of gravity over the conveying head 40 into the lowest area of a feeding space 2. From there the material can then be transported during pivoting of the conveying arm 4 in its feed direction, i.e., clockwise, by means of the front 17 of the conveying head 40 to the transfer area 11 to the conveying device and/or press 14.

Figure 6:
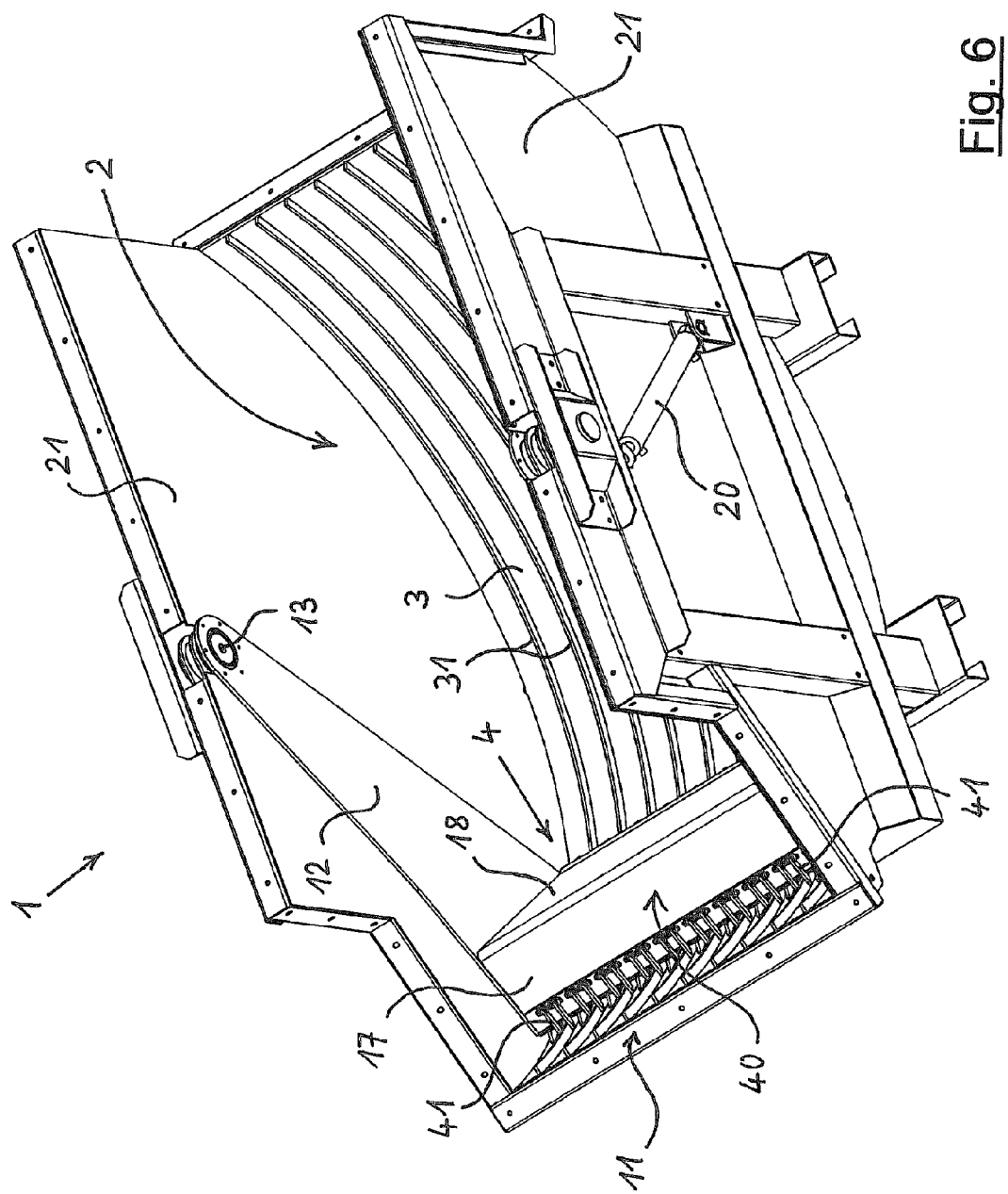

FIG. 6 of the drawing shows the feed device 1 in another variant in a view obliquely from above so that the view of the viewer falls into the interior of the feeding space 2 and its bottom 3. The feed device 1 also has the feeding space 2 here with the side walls 21 and bottom 3. The conveying arm 4 is pivotable back and forth around its pivot axis 13 in the feeding space 2. The bottom 3 is again bent in the form of an outer cylindrical surface section, in which the center axis of the imaginary cylinder runs through the pivot axis 13 of the conveying arm 4. The conveying arm 4 also consists here of the conveying head 40 and the two lateral lever arms 12, whose upper ends are each mounted in the pivot axis 13 on side walls 21. Also consistent with the previous practical examples the conveying head 40 has a front 17 aligned essentially at right angles to bottom 3 and a back 18 aligned under a flat obtuse angle relative to bottom 3. The space radially inward from conveying head 40 between the lever arms 12 is also free here in order to permit passage of the pressing material. To drive the conveying arm 4 a power drive 20 is used, which is arranged on the outside of the side wall 21 facing the viewer and is formed here by a hydraulic cylinder. For symmetric power introduction an identical power drive 20 can also be arranged on the side wall 21 of the feeding space 2 facing away from the viewer.

Ribs 31 running parallel to each other on the bottom 3 are arranged or molded on, which run parallel to the pivot direction or movement direction of the conveying arm 4. Conveying prongs 41 are also arranged on the front 17 of the conveying head, whose free end extends between the ribs 31. The conveying prongs 41 are articulated with the conveying head 40 here so that during back movement of the conveying head 50 these conveying prongs 41 are swiveled forward and upward by the flat material lying on bottom 3 and allow the pressing material to pass beneath. During forward movement of the conveying head 40 these prongs 41, when they encounter the pressing material, are swiveled downward and rearward against the front 17 of conveying head 40 in an essentially radial alignment and then reliably push the seized material into the transfer area 11 and to the conveying device and/or press (not shown here). The conveying prongs 41 can then be preloaded with a force, like spring force, which supports alignment of the conveying prongs 41 in the radial direction.

Figure 7:
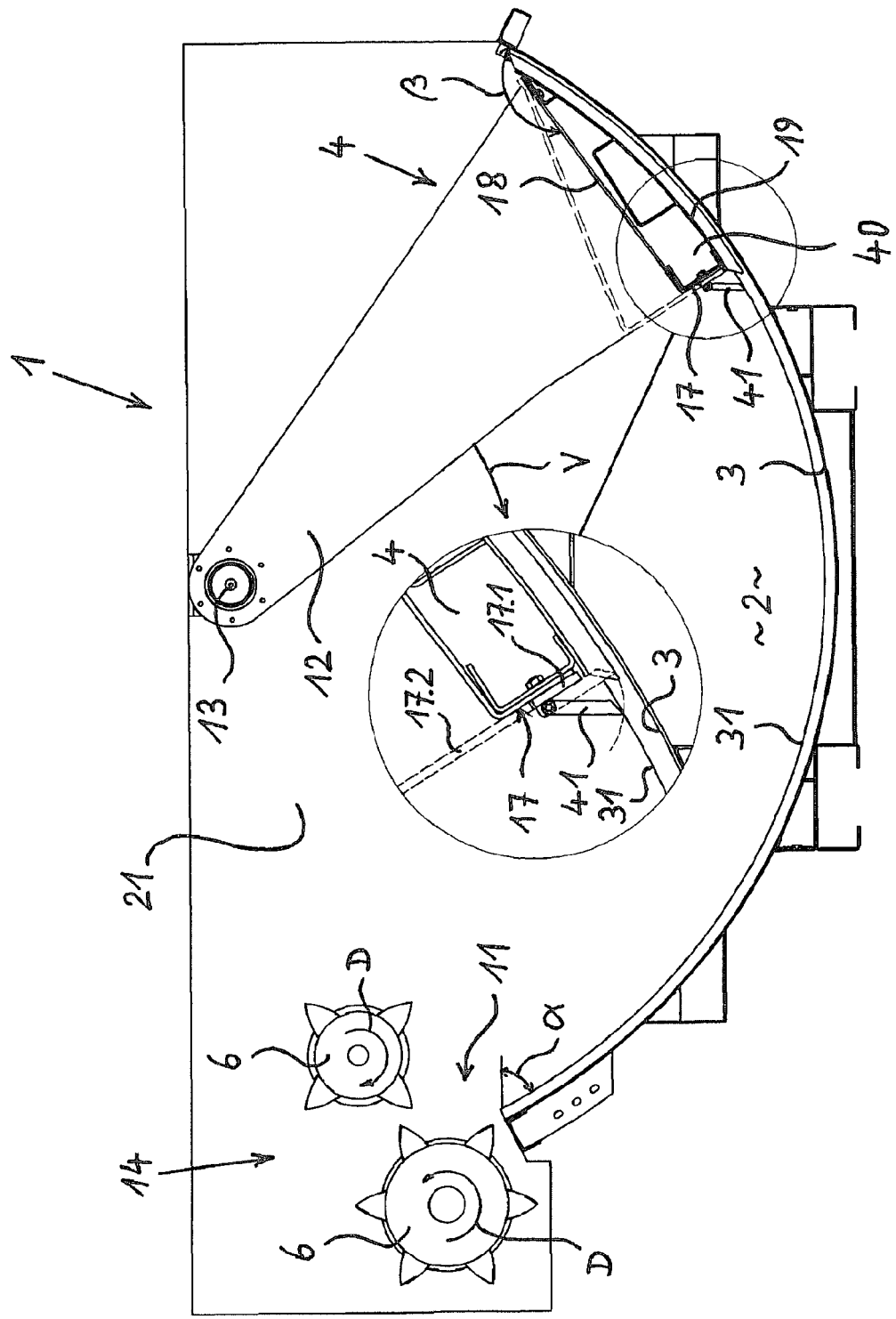

FIG. 7 shows the feed device 1 from FIG. 6 in a vertical section. Here the bending of the bottom 3 in the form of an outer cylindrical surface is particularly apparent, via whose top the conveying arm 4 can be swiveled back and forth around its pivot axis 13 by means of lever arms 12. Ribs 31 that run parallel to the pivot direction or movement direction of the conveying arm 4 are arranged on bottom 3, only one of which is visible in the section according to FIG. 7. In its end area lying directly in front of two rotor rollers 6 the bottom 3 rises to the horizontal under angle α when viewed in the feed direction in order to also guarantee that material still not seized by the rotor roller 6 falls or slides back into the lowest area of the feeding space 2 during back movement of the conveying arm 4 from the transfer area 11.

As further shown in FIG. 7, the conveying head 40 is a roughly triangular hollow element when viewed in cross section whose front 17 runs essentially perpendicular to bottom 3, i.e., in the radial direction of the conveying arm 4. The rear wall 18 here runs under a very flat obtuse angle β relative to bottom 3. The bottom 19 of the conveying head 40 is adapted to the bent shape of bottom 3.

The conveying prongs 41 are individually articulated on the front 17 and the conveying head 40, in which only one of the conveying prongs 41 is apparent in the section in FIG. 7. The conveying prong 41 in FIG. 7 is shown in the position that it assumes during back movement of the conveying arm 4 and passage of a flat piece of pressing material lying between ribs 31 and therefore not visible here. If the pivot direction of the conveying arm 4 is reversed, the conveying prongs 41 then pivot in an essentially radial alignment parallel to the front 17 of the conveying head 40 and now extend between the ribs 31. Because of this the free end of the conveying prong 41 or several conveying prongs 41 strikes the flat pressing material lying between ribs 31 and pushes it in front of it to the transfer area 11 to rotor roller 6. In this way even flat small-surface material is reliably conveyed and interfering jamming of the material between bottom 3 and conveying head 40 is avoided.

In FIG. 7 the circled detail on the bottom right is additionally shown as an enlarged cutout. It is apparent here that the height of the front 17 of the conveying head 40 is variable when viewed in the radial direction of the conveying arm 4. For this purpose the front 17 of the conveying head 40 consists of two wall parts 17.1 and 17.2 more or less overlapping each other and adjustable relative to each other and fastenable. Because of this the front 17 can be adapted in its surface size to different materials being processed.

The conveying device and/or press 14 here consists of two oppositely rotatable rotor rollers 6 whose working direction of rotation is shown with the rotation arrow D. Pressing material, which is conveyed by the conveying head 40 of the conveying arm 4 into the transfer area 11, is seized there by the two rotor rollers 6 and then conveyed further between the two rotor rollers 6 and already precompacted in order to then be further processed, especially pressed, in a downstream unit not shown here.

Figure 8:
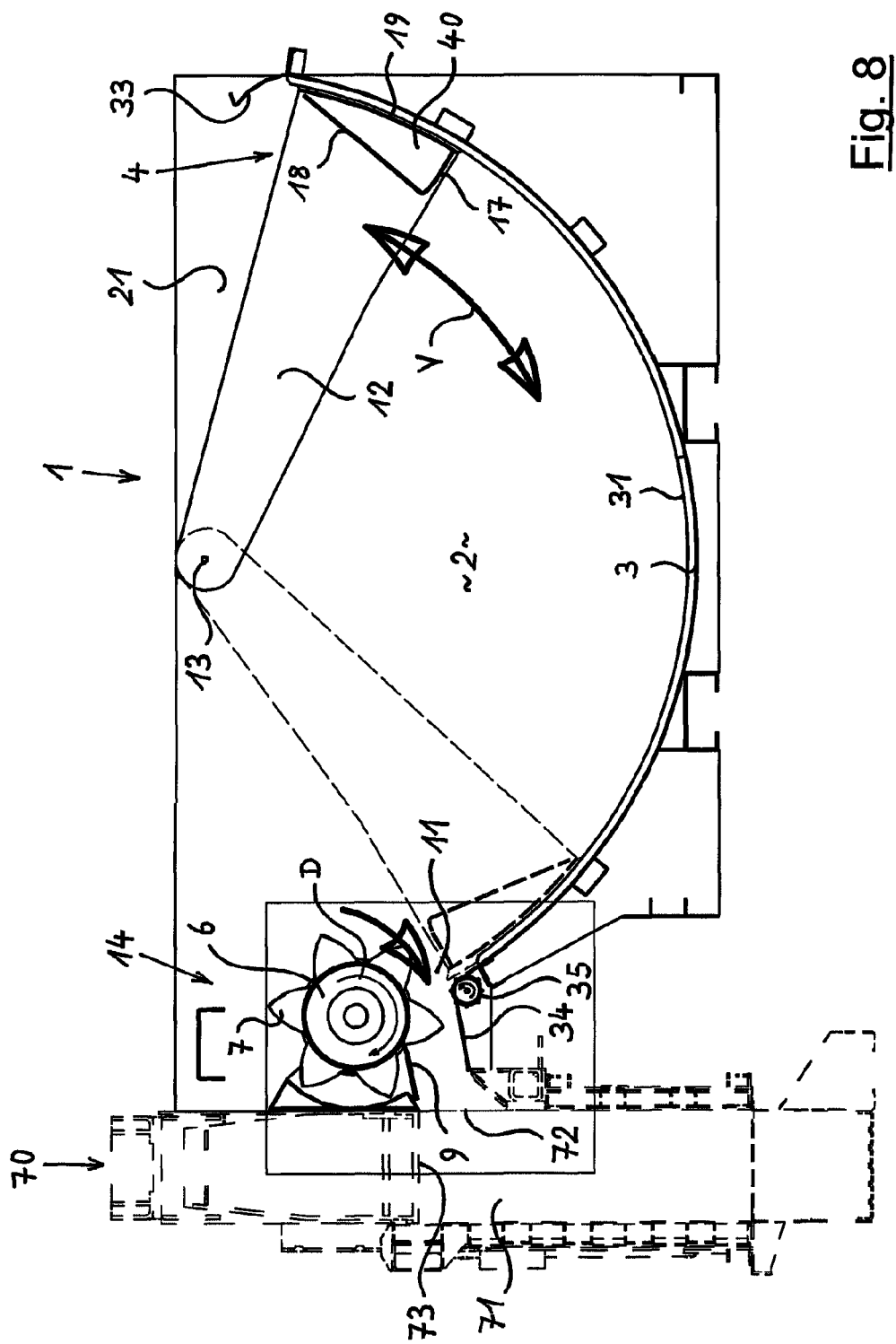

FIG. 8 shows the feed device 1 together with the conveying device and/or press 14 and a downstream baling press 70 indicated with a dashed line in a vertical section. It is characteristic for this variant that it has a single rotor roller 6 in the conveying device and/or press 14 and a feed roller 35 running parallel to it. The feed roller 35 forms a transition in the transfer area 11 from the bottom 3 to the slide and guide plate 34. The rotor roller 6 with its teeth 7 has an operating direction of rotation D, which runs clockwise in FIG. 8, whereas the feed roller 35 has an opposite direction of rotation. The feed roller 35 supports transfer of the pressing material, which is conveyed by the conveying arm 4 with its conveying head 40 into the transfer area 11, to the conveying device and/or press, here in the form of rotor roller 6, which cooperates with the slide and guide plate 34.

The baling press 70 is shown as a unit that is connected downstream of the feed device 1 and the conveying device and/or press 14. The baling press 70 has a press chamber 71 in which pressing material can be filled through a feed opening 72 by means of the conveying device and/or press 14. In the interior of press chamber 71 a pressing shield 73 can be moved up and down by means of a power drive in order to compact the material filtered through the press chamber 71 and form compact, transportable pressing product bales.

FIG. 8 also shows on the side facing away from rotor roller 6 of bottom 3 a fixed pressed material return bend 33, which lengthens upward with increasing curvature going beyond a vertical direction. Because of this the pressing material, which is situated on the back 18 of conveying head 40 during pivoting of the conveying arm 4 by the rotor roller 6, is conveyed beyond the conveying head 40 and brought back to the front 1 of the conveying head 40 in order to be able to feed the transfer area 11. With respect to additional details in FIG. 8 the preceding description is referred to.

Figure 9:
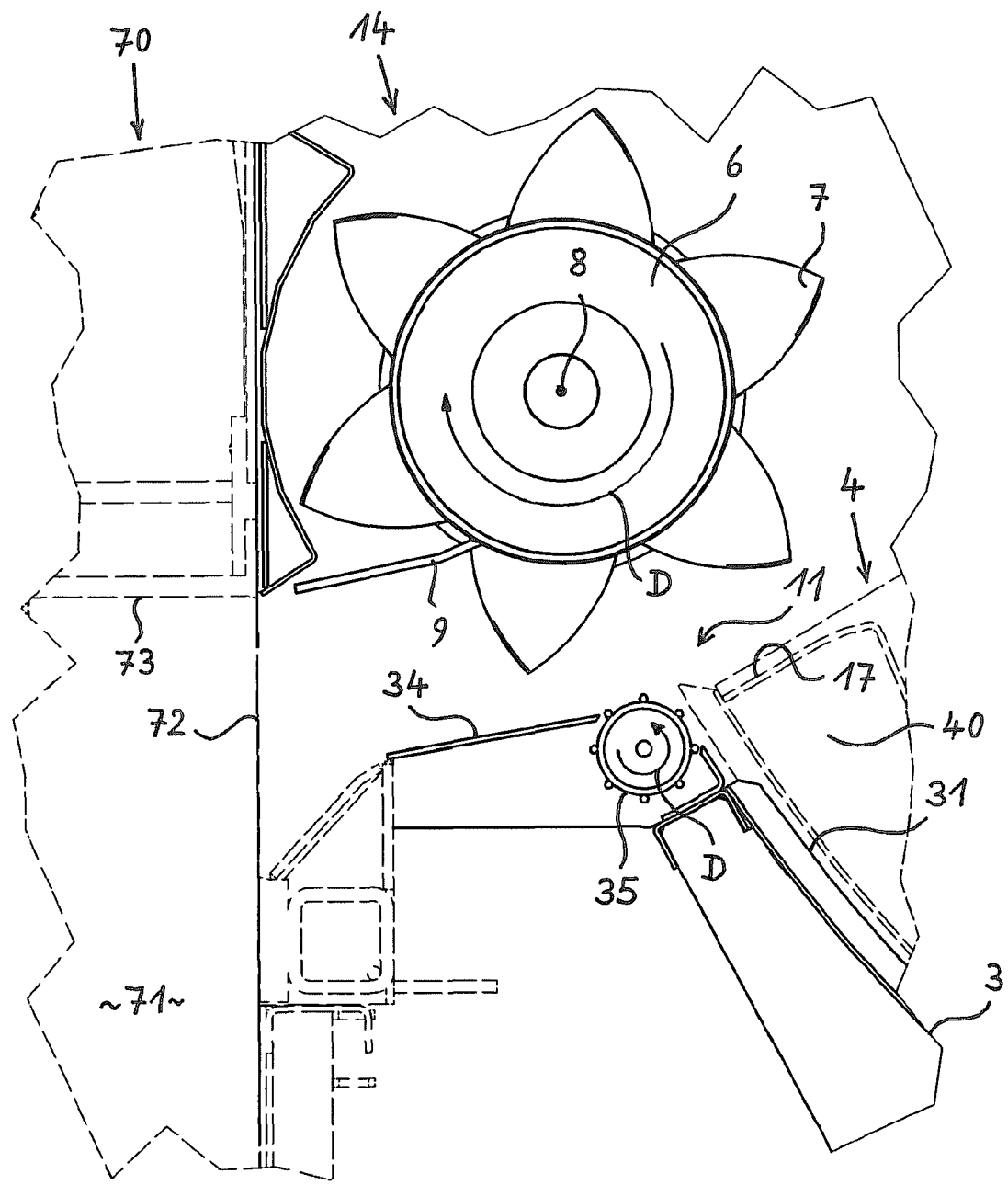

FIG. 9 shows in an enlarged view the framed cutout in FIG. 8. In the top of FIG. 9 the conveying device 14 lies with rotor roller 6, which is equipped with teeth 7 and which can be driven in the working direction of rotation D, here clockwise, around its axis of rotation 8. By means of stripper 9 pressing material adhering to the teeth 7 can be stripped off. Beneath rotor roller 6 and parallel to it there is a feed roller 35, which can be driven with its axial direction of rotation D, here counterclockwise. To the right below feed roller 35 the part of bottom 3 lying next to the transfer area 11 is visible, on which a section of a rib arranged on it is apparent. Part of the conveying arm 4 with conveying head 40 is drawn with a dashed line in its end position facing the transfer area 11. The slide and guide plate 34 lies to the left of the feed roller 35. As shown in FIG. 9, the feed roller 35 with its outer periphery forms a rounded transition from the bottom 3 to the slide and guide plate 34. The outer periphery of the feed roller 35 is structured, for example, by rods or strips running in the longitudinal direction, in order to guarantee a good conveying effect to the pressing material fed to the transfer area 11. By means of rotating rotor roller 6 with teeth 7 the pressing material is then transported between the rotor roller 6 and the slide and guide plate 34 arranged beneath it and already precompacted and then fed through the feed opening 72 into the press chamber 71 of the downstream baling press 70. During this filling of press chamber 71 of the baling press 70 the pressing shield 73 is situated in its uppermost position, as indicated in FIG. 9. For a pressing process with the conveying device 14 stopped, the pressing shield 73 is moved downward by a power drive not shown here, like a hydraulic cylinder.

Figure 10:
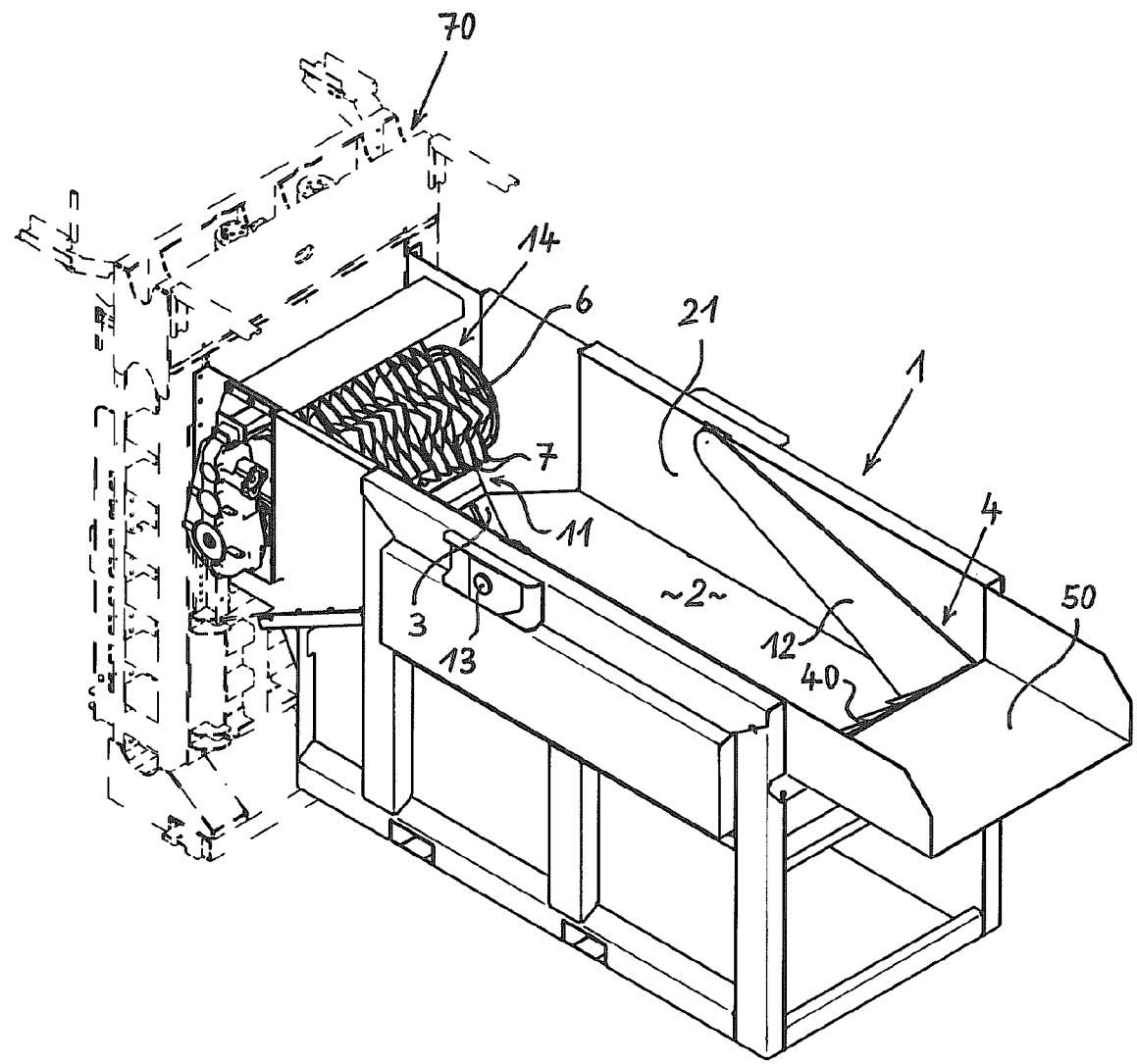

FIG. 10 shows the feed device 1 together with the conveying device and/or press 14 and the indicated baling press 70 in a perspective view obliquely from above. The conveying arm 14 is situated here in its end position facing away from rotor roller 6. From this position the conveying arm 4 can be swiveled around its pivot axis 13 forward, that is in the direction toward rotor roller 6 in order to transport the material introduced to the feeding space 2 into the transfer area 11 to the conveying device and/or press 14.

To the right in FIG. 10 a material delivery table 50 is apparent, which runs essentially horizontally and which is connected to the end of the bottom 3 of feed device 1 facing away from rotor roller 6. An operating person can position the pressing material on the material delivery table 50 and then push it into the feeding space 2 with it. The material delivery table 50 can also be swiveled upward with its free end in order to tilt the positioned material into the feeding space 2.

Introduction of pressing material into the feeding space 2 can then occur independently of the actual position of the conveying arm 4 at any time, i.e., continuously, since it is irrelevant whether the material just introduced falls in front of or behind the conveying head 40. This is also an essential difference and advantage relative to the initially cited prior art with a flat conveying shield, since in this case continuous filling of the feeding space is not possible. If pressing material goes behind the conveying shield, this easily leads to disturbances.

Figure 11:
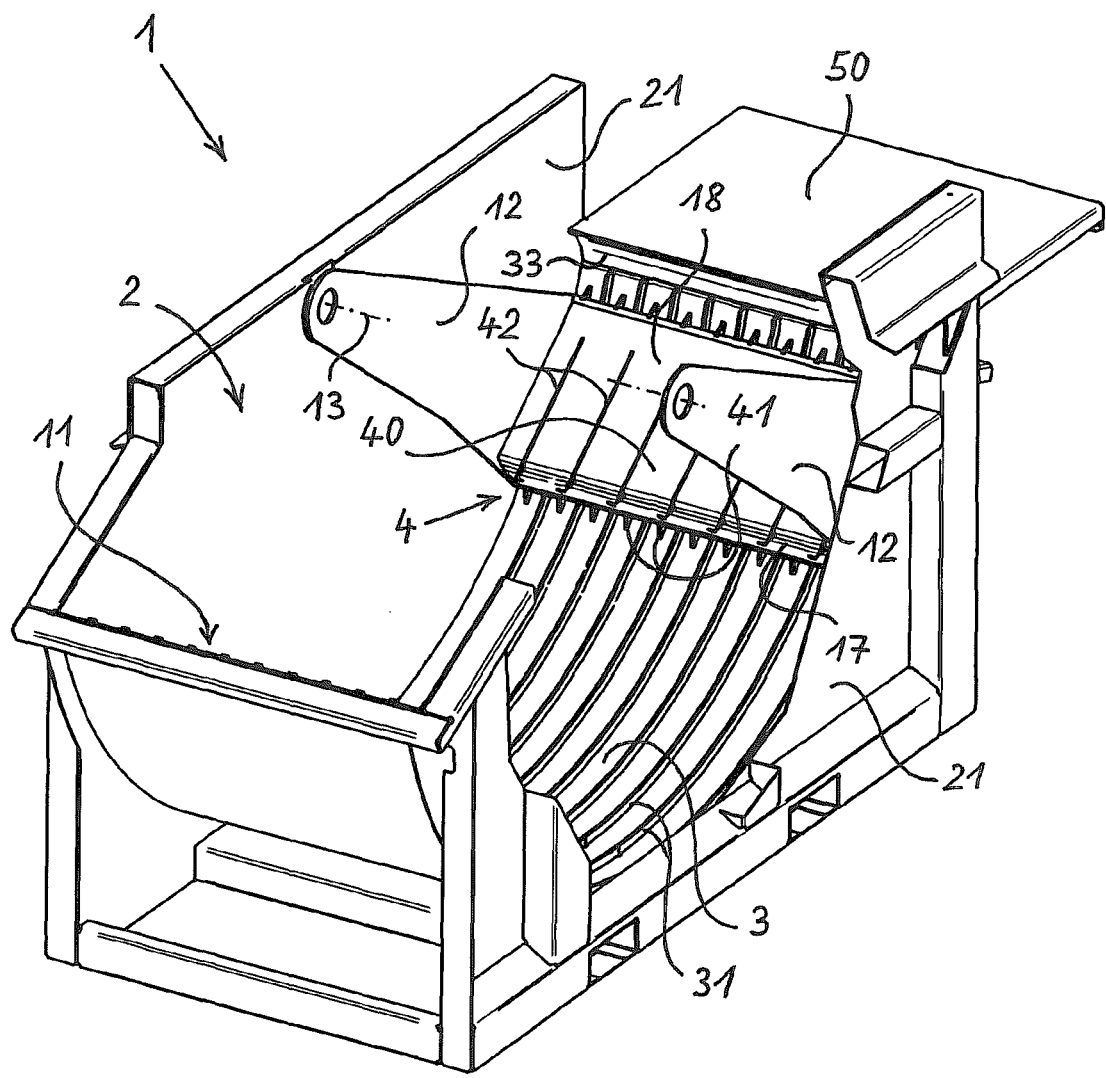

FIG. 11 of the drawing shows the feed device 1 in an additional variant, partially in a broken down view seen obliquely from above so that the view of the viewer falls into the interior of the feed device 1. The feed device 1 also has a feeding space 2 with side walls 21 and a bottom 3. A conveying arm 4 is again pivotable back and forth in feeding space 2 around a pivot axis 13. The bottom 3 is bent in the form of an outer cylindrical surface section, the center axis of the imaginary cylinder running through the pivot axis 13 of the conveying arm 4 running above the bottom.

The conveying arm 4 consists of a conveying head 40 and the two lateral lever arms 12, whose upper end is mounted in the pivot axis 13 outside walls 21. The conveying head 40 also has a front 17 aligned essentially at right angles to bottom 3 and a back 18 aligned at a flat obtuse angle relative to bottom 3. A power drive, which is not shown here, serves to drive the conveying arm 4.

Ribs 31 running parallel to each other are arranged on bottom 3, for example, mounted as strips or molded on in one piece, which run parallel to the pivot direction of the conveying arm 4 and to the movement direction of the conveying head 40. Conveying prongs 41 are arranged on the front 17 of the conveying head 40, whose free ends extend between ribs 31.

The conveying head 40 is also equipped with articulated drivers 42, which are designed here in the form of plates aligned vertically to the surface of bottom 3. If the conveying head 40 during its movement in the feed direction, i.e., forward in FIG. 11, encounters the pressing material, the material moves the driver 42 upward so that the effective surface of the front 17 of the conveying head 40 is enlarged.

On its feed side lying to the rear in FIG. 11 the feed device 1 has a horizontally aligned material delivery table 50. To introduce material into the feed device 1 the pressing material is initially placed on the material delivery table 50 and then pushed on it forward, i.e., in the direction toward feeding space 2. Over the front edge of the material delivery table 50 the pressing material then falls into the feeding space 2, where it is fed by the conveying arm 4 moved back and forth to a transfer area 11 lying to the front in FIG. 11 to a conveying device and/or press not shown here. The rear end of bottom 3 in FIG. 11 grades into a material return bend 33, which ensures that the pressing material, which is situated on the back 18 of the conveying head 40, is conveyed over the conveying head 40 to its front 17 when the conveying arm 4 reaches its rear reversal point.

Figure 12:
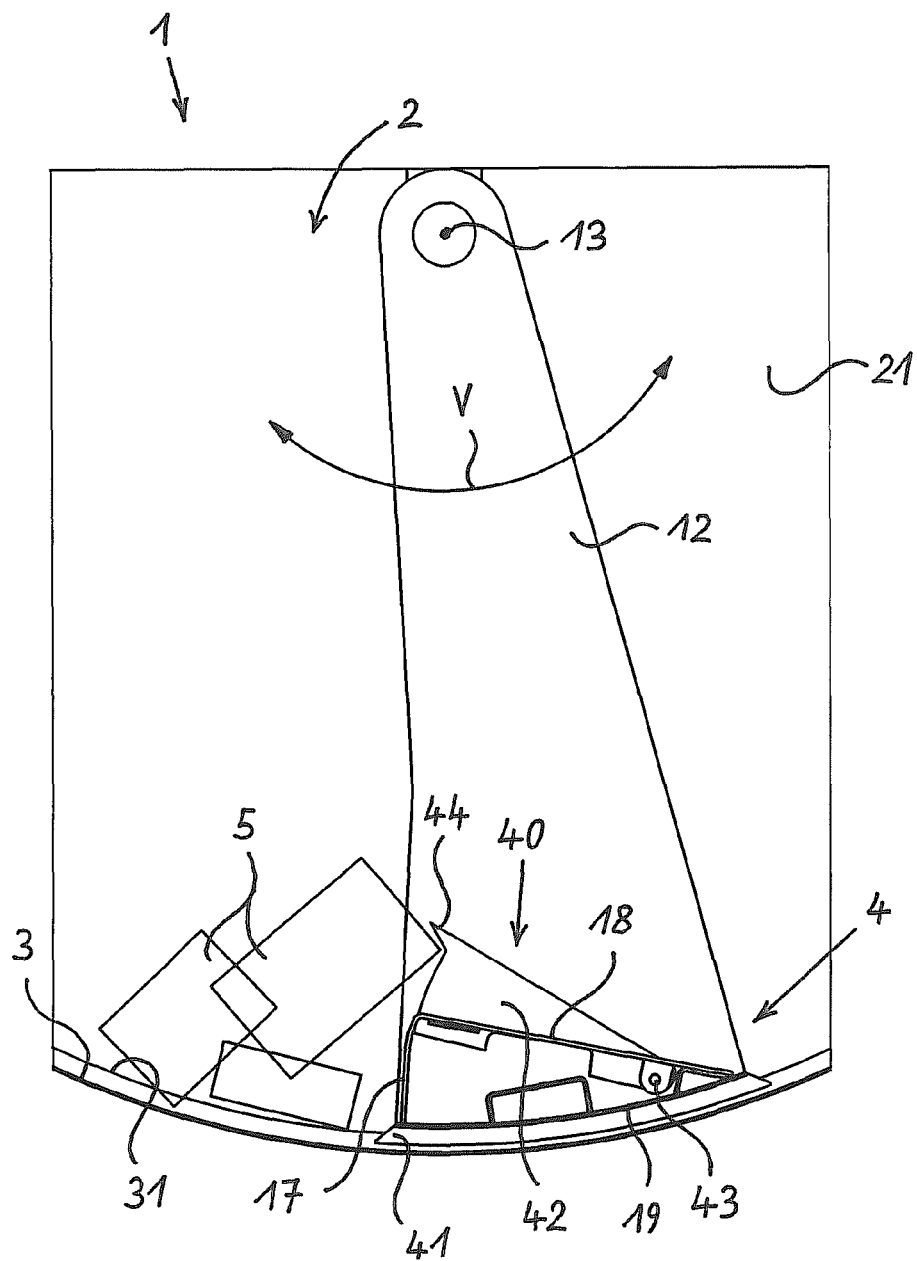

A detail of the feed device 1 from FIG. 11 is shown in an enlarged view in FIG. 12, in which especially the conveying arm 4 is visible with its conveying head 40. On the very bottom of FIG. 12 there is a section of bottom 3 with a rib 31 arranged on its top. The conveying head 40 has the front 17 running essentially vertically relative to the surface of bottom 3 and a back 18 running under a large obtuse angle relative to the surface of bottom 3.

The drivers 42 in conveying head 40 are mounted to pivot around the common axis 43, in which the axis 43 runs parallel to the pivot axis 13 of the conveying arm 4. The conveying arm 4 is shown in FIG. 12 during its movement in the feed direction in which it moves clockwise. Pressing material 5 in the feeding space 2, for example, cardboard packaging, is seized by the front 17 of the conveying head 40 and conveyed further. Because of the pressure force that is exerted, the parts of the pressing material 5 make sure that the drivers 42 visible in FIG. 12 enter the upward swiveled position. This pivoting is conveyed by each driver 42 to a forward protruding tooth 44. Overall with respect to pressing material 5 an enlarged surface of the front 17 of conveying head 40 is created. When the conveying arm 4 moves back, i.e., is swiveled counterclockwise according to FIG. 12, the drivers 42 fall back under the effect of their own weight into the conveying head 40 and do not prevent passage of the pressing material 5 above conveying head 40 from its back 18 to its front 17.

On the bottom 19 of conveying head 40 a parallel conveying prong 41 is shown there, each conveying prong 41 running through the intermediate space between two adjacent ribs 31.

Figure 13:
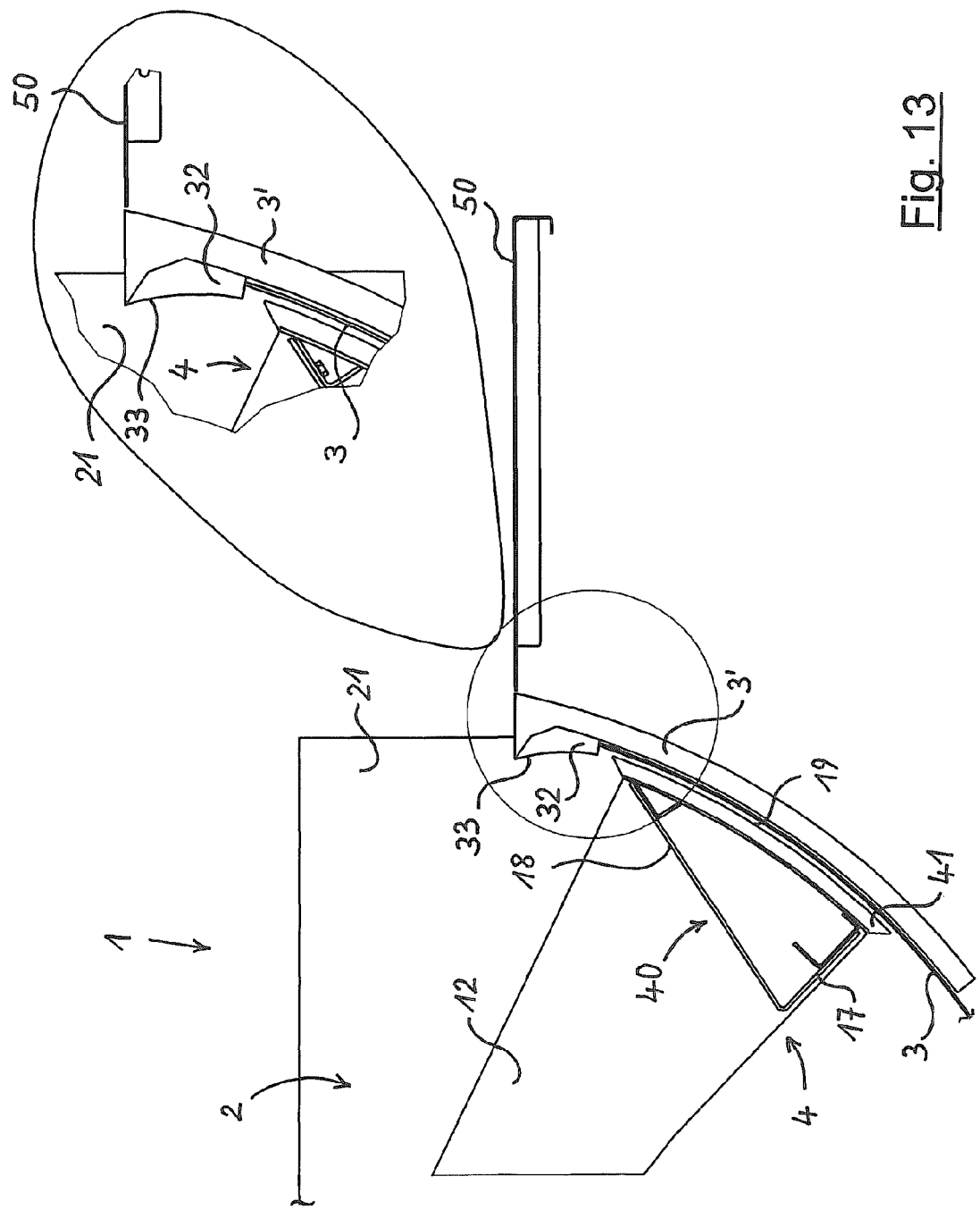
Figure 14:
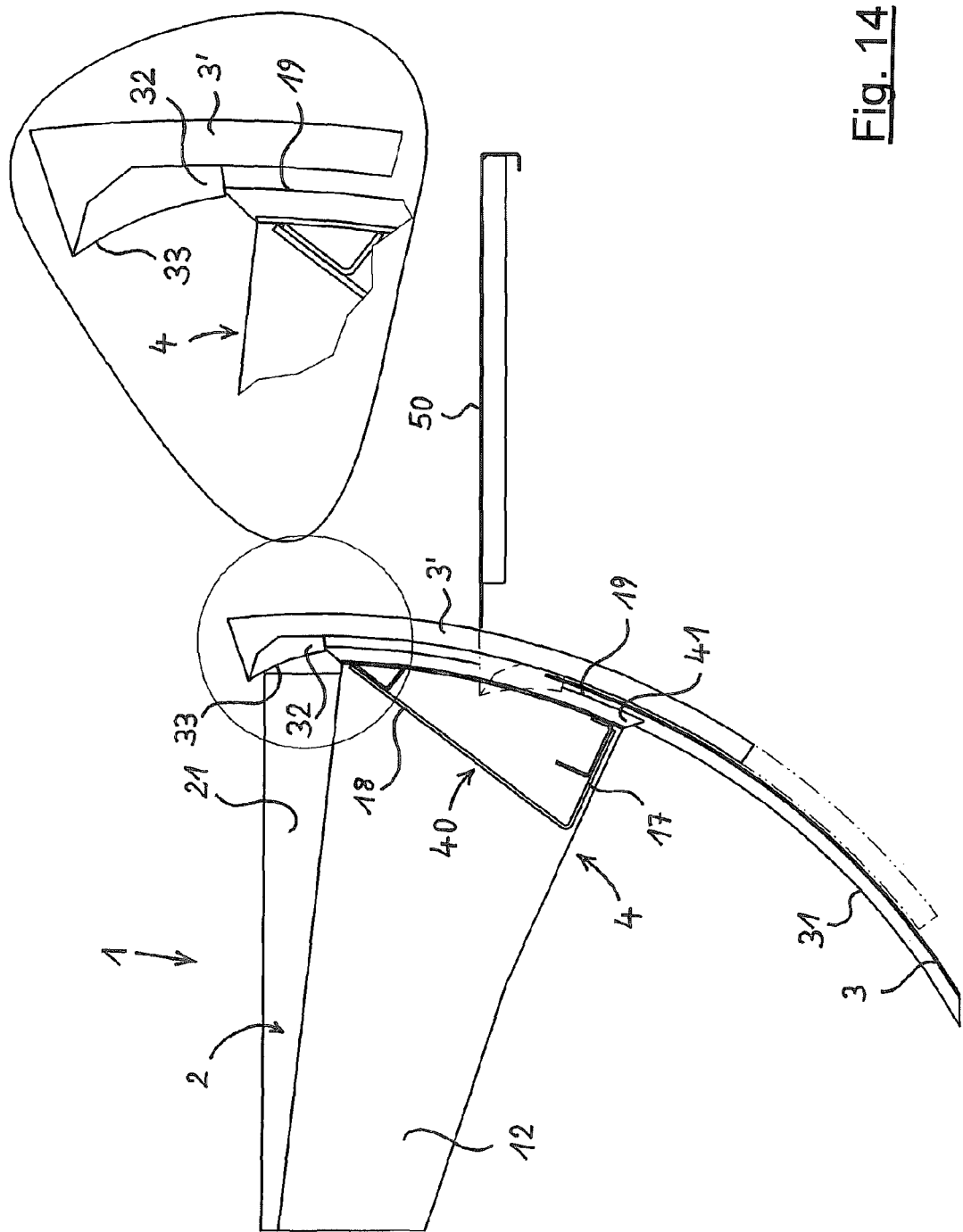

Another variant of the feed device 1 is shown in FIGS. 13 and 14. For this variant it is characteristic that the bottom 3 in its area adjacent to the material delivery table 50 has a pivotable bottom part 3'. The bottom part 3' is also designed in the form of a hollow cylindrical section and pivotable parallel to the rest of bottom 3.

The pivotable bottom part 3' is shown in FIG. 13 in its lower base position in which an upper edge of the bottom part 3' lies flush with the horizontal surface of the material delivery table 50. In this position of bottom part 3' material can be pushed from the material delivery table 50 into the feeding space 2. The conveying head 40 of the conveying arm 4 is situated here in the position beneath the plane of the material delivery table 50. Close to the upper edge of the pivotable bottom part 3' a driver 32 is mounted, which, depending on the position of the conveying arm 4, engages and disengages with the rear edge of the conveying head 40. The upper end section of the pivotable bottom part 3' forms a material return bend 33 with the function already described above.

On the right top in FIG. 13 the circled area of the feed device 1 is shown enlarged.

FIG. 14 shows in the same depiction as in FIG. 13 the feed device 1 in a second operating position. In this operating position the conveying arm 4 has almost reached its rear reversal point, in which the conveying head 40 is not situated at least partly at a height above the material delivery table 50. In this position the driver 32 of the pivotable bottom part 3' is engaged with the rear edge of the conveying head 40 facing upward in FIG. 14. The conveying arm 4 has then swiveled the bottom part 3' by a certain path upward so that the pivotable bottom part 3' now lies partly above the surface of the material delivery table 50. In this operating position the pivotable bottom part 3 blocks introduction of material from the material delivery table 50 into the feeding space 2 and protects the operating personnel active on the feed device 1 from hazards, and especially from material suddenly pushed upward as a result of contact with the conveying head 40.

Any material situated on the back 18 of the conveying head 40 is moved forward by means of the material return bend 33 above the conveying head 40 and then falls downward into the lowest area of the feeding space 2 in order to be taken up there during the next feed stroke of the conveying arm 4 in the feed direction.

On the right top in FIG. 14 the circled area of the drawing is again shown as an enlarged detail.

Figure 15:
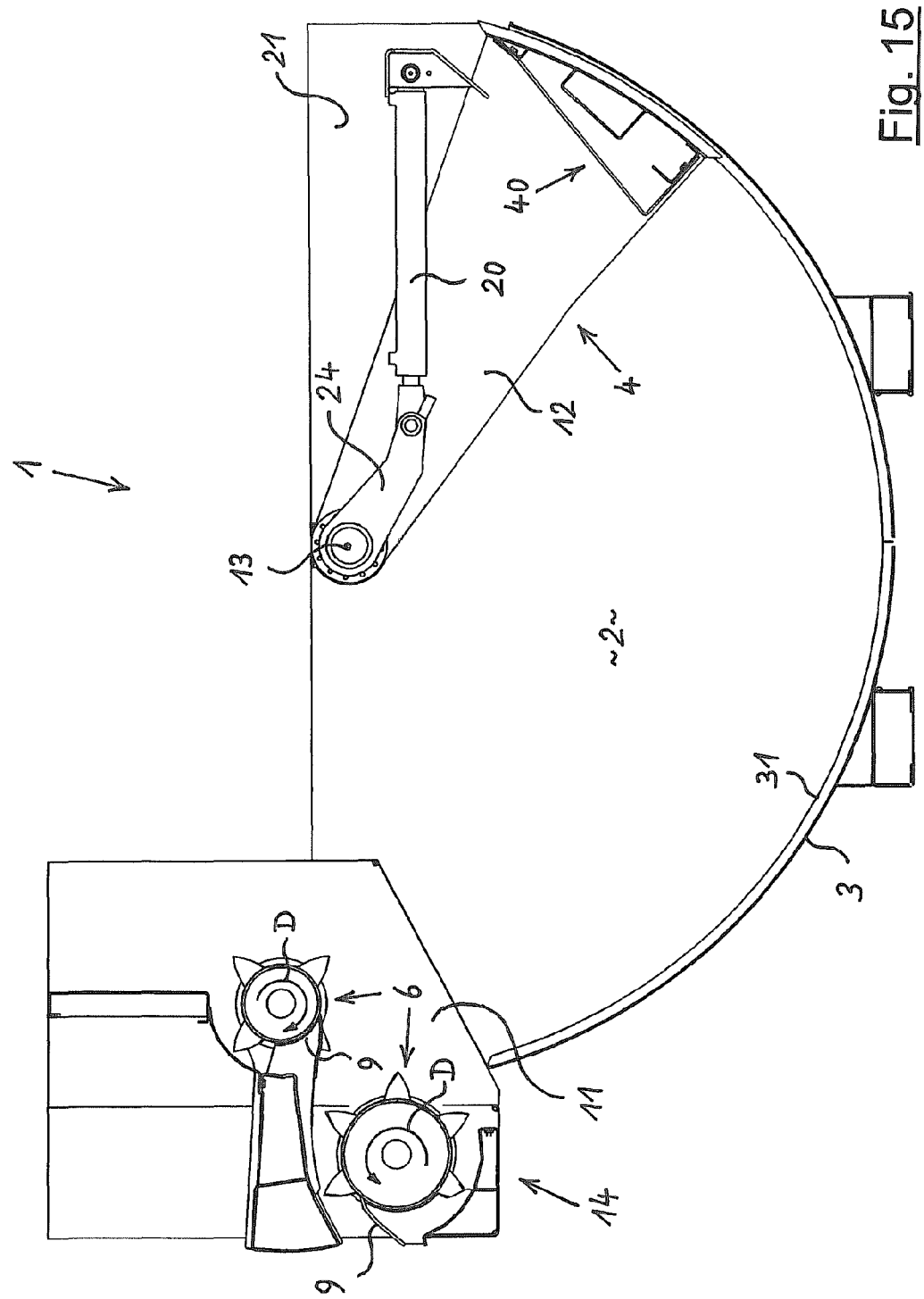
Figure 16:
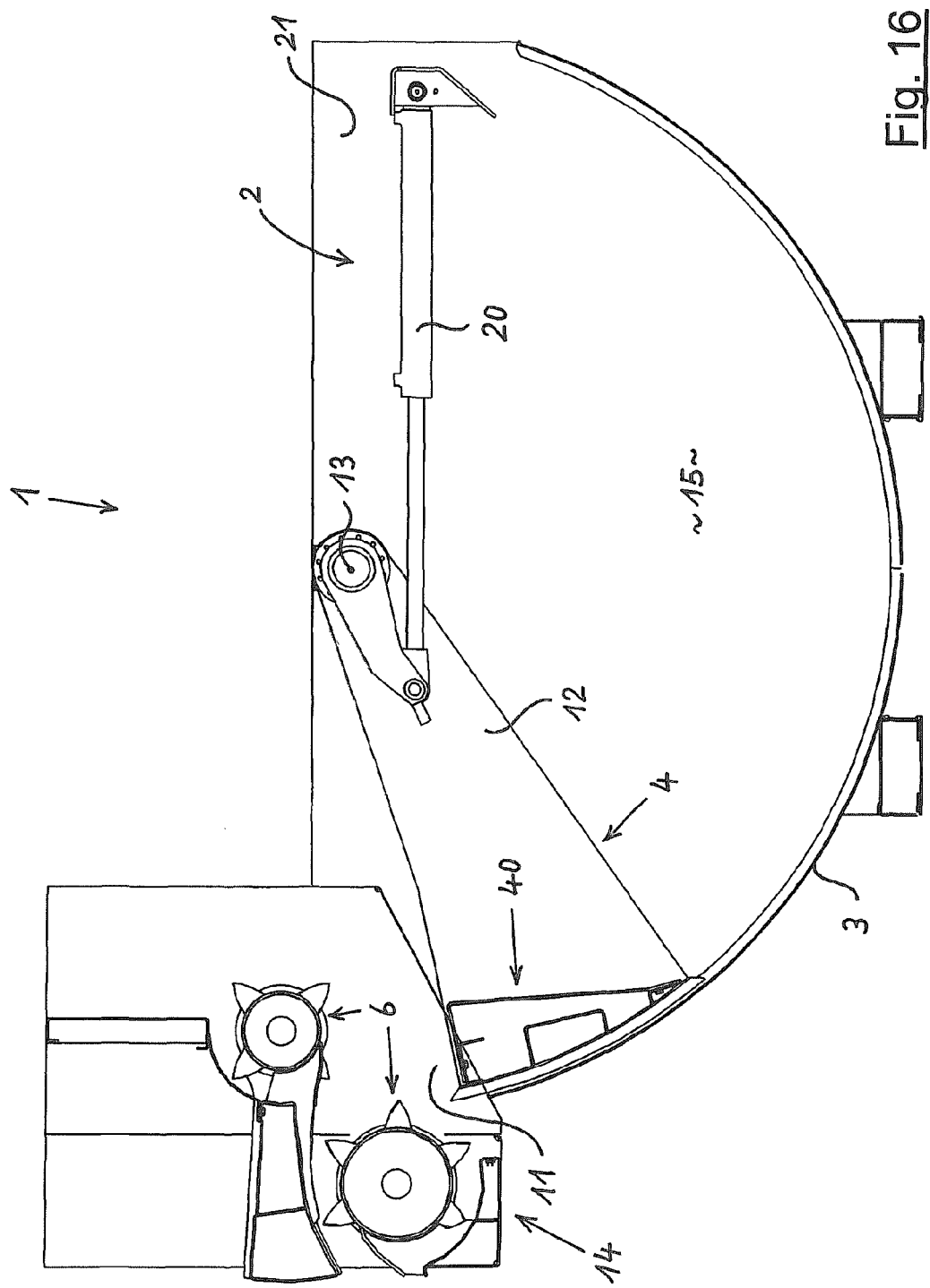

In FIGS. 15 and 16 of the drawing an additional variant of the feed device 1 is shown, for which it is characteristic that the power drive 20 for the conveying arm 4 is arranged in the feeding space 2. The power drive 20 is formed here by an individual or two parallel arranged hydraulic piston-cylinder units. One end of the piston-cylinder unit or each piston-cylinder unit is articulated to a side wall 21 of the feeding space 2, the other end is articulated to a pivot lever 24, which in turn is joined free of rotation to the conveying arm 4. By extension and retraction of the piston rod of the piston cylinder unit(s) a conveying arm 4 is placed in its back and forth pivot movement.

The conveying device and/or press 14 is designed here with two oppositely driven rotor rollers 6, between which the material is conveyed and fed to a downstream collection container or press space not shown here. A stripper 9 is arranged on the outlet side of the two rotor rollers 6.

In FIG. 15 the conveying arm 4 is situated close to its rear reversal point; the conveying arm 4 in FIG. 16 is situated on its front reversal point so that now the conveying head 40 lies in the transfer area 11 to the conveying device and/or press 14. In this position the possibility is created for excess material that cannot be immediately processed by the rotor roller 6 to be able to fall back over the conveyer 40 rearward into the feeding space 2. Overloading of the rotor rollers 6 and their drive is thus avoided.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMBERS

Character Name
1 Feed device
2 Feeding space
3 Bottom of 2
3' Pivotable bottom part
4 Conveying arm
5 Pressing material
6 Rotor roller
7 Tooth
8 Rotational axis of 6
9 Stripper
10 Pivot axis of 9
11 Transfer area
12 Lever arm
13 Pivot axis of 4
14 Conveying device and/or press
15 Container interior
16 Collection container
17 Front of 4
17.1, 17.2 Wall parts of 17
18 Back of 4
19 Bottom of 40
20 Power drive for 4
21 Side walls of 2
24 Pivot lever on 4
31 Ribs on 3
32 Driver on 3'
33 Material return arc
34 Slide and guide plate
35 Feed roller
40 Conveying head
41 Conveying prong
42 Driver on 40
43 Driver of 42
44 Tooth on 42
50 Material delivery table
60 Table extension
61 Pivot axis of 60
62 Free side of 60
63 Curved section
70 Baling press
71 Press chamber
72 Feed opening
73 Pressing shield
D Operating direction of rotation of rotor roller(s)
V Pivot direction of conveying arm

The invention claimed is:

1. At least one of a conveying device and a press with a feed device, the feed device being connected in an area on an upstream side of the at least one of the conveying device and the press, comprising:
 a feeding space for pressing material, in which a bottom of the feeding space is bent in the form of an outer cylindrical surface section and rises into a transfer region in front of a connection area for the at least one of the conveying device and the press,
 a conveying apparatus for the pressing material pivotable back and forth by means of a power drive arranged in the feeding space, a pivot axis of the conveying apparatus coinciding with an imaginary center axis of the outer cylindrical surface section,
 at least one rotatable rotor roller being arranged in the transfer region of the feed device for further conveying of the pressing material,
 the conveying apparatus comprising a conveying arm having a conveying head connected immovably to two spaced apart conveyor lever arms, a space situated radially inwardly from the conveyor head between the lever arms of the conveyor arm remaining open to permit a passage of pressing material therebetween, the conveying arm being movable back and forth for conveying a limited amount of the material to be pressed from a position in a lower area of the bottom upward to the transfer region by the conveying head above the bottom, the conveying head having an effective conveying surface with a limited size such that an excess of pressing material that cannot be immediately processed by the at least one roller can fall past the conveyor head and between the lever arms, back into a lowest region of the feeding space.

2. The at least one of a conveying device and a press according to claim 1, wherein viewed in the radial direction of the conveying arm the conveying head has a height starting from the bottom, which extends over a maximum of 25% of a radius of the conveying arm.

3. The at least one of a conveying device and a press according to claim 1, wherein an angle over which the conveying arm can be pivoted is between 60 and 180°.

4. The at least one of a conveying device and a press according to claim 1, wherein the bottom of the feeding space has a slope angle α relative to horizontal between 25 and 90° in the transfer region.

5. The at least one of a conveying device and a press according to claim 1, wherein the conveying head of the conveying arm has a back facing away from the feed direction and extending obliquely relative to the bottom at an obtuse angle β.

6. The at least one of a conveying device and a press according to claim 1, wherein the conveying head of the conveying arm has a front facing the transfer region in the feed direction and extending at right angles to the bottom.

7. The at least one of a conveying device and a press according to claim 1, wherein the bottom of the feeding space has parallel ribs on an upper surface, which ribs extend in the feed direction of the conveying arm.

8. The at least one of a conveying device and a press according to claim 1, wherein at least one brush is arranged on a front of the conveying head facing the transfer region.

9. The at least one of a conveying device and a press according to claim 1, wherein a front of the conveying head facing the transfer region is adjustable in height.

10. The at least one of a conveying device and a press according to claim 1, wherein the conveying head is a hollow element triangular in cross section in which a front of the conveying head facing the transfer region comprises two wall parts lying one on the other, shiftable in height direction relative to each other, and fastenable relative to each other.

11. The at least one of a conveying device and a press according to claim 1, wherein the bottom, bent in the shape of a outer cylindrical surface section, on an end facing away from the transfer region grades into a pressing material return bend which is bent more tightly in the same direction and extends beyond the vertical.

12. The at least one of a conveying device and a press according to claim 1, wherein a linearly oscillating power drive is provided as a power drive of the conveying arm and wherein a moving end of the power drive is articulated via a transmission angle lever with a pivot lever of the conveying arm.

13. The at least one of a conveying device and a press according to claim 1, wherein on an end of the bottom of the feeding space facing the transfer region a feed roller extending parallel to the at least one rotor roller is arranged.

14. The at least one of a conveying device and a press according to claim 1, wherein the feed device forms a separate unit, which can be connected via releasable connection devices to one of the conveying device, the press, a baling press and a collection container, and separated from it.

15. The at least one of a conveying device and a press according to claim 1, wherein the feed device is integrated with the one of the conveying device, press, a baling press and a collection container and firmly connected to it.

16. The at least one of a conveying device and a press according to claim 1, wherein the conveying head of the conveying arm carries drivers on a front facing the transfer region in the feed direction, which can be swiveled passively around a pivot axis extending parallel to and behind the front.

17. The at least one of a conveying device and a press according to claim 16, wherein the drivers are designed as vertically aligned triangular plates with an acute rear angled corner, in which the pivot axis of the driver extends through the acute rear angled corner of the triangular plate and in which a front upper edge has at least one tooth protruding beyond the conveying head.

18. The at least one of a conveying device and a press according to claim 17, wherein conveying prongs that engage between ribs are arranged on a front of conveying head facing the transfer region.

19. The at least one of a conveying device and a press according to claim 18, wherein the conveying prongs are articulated relative to the conveying head.

20. The at least one of a conveying device and a press according to claim 18, wherein each rib is assigned a pair of two conveying prongs of the conveying head, which run on both sides of the rib.

21. The at least one of a conveying device and a press according to claim 20, wherein the conveying prongs are one of individual fingers connected to the conveying head and a prong comb connected to the conveying head.

22. The at least one of a conveying device and a press according to claim 1, wherein a material delivery table is connected upstream of the feeding space on a side facing away from the transfer region, a surface of the delivery table accommodating pressing material being introduced to the feeding space.

23. The at least one of a conveying device and a press according to claim 22, wherein the bottom of the feeding space, in an area adjacent to the material delivery table, is provided with a bottom part pivotable parallel to the conveying arm, in which the bottom part, in a position of the conveying arm extending above the material delivery table, blocks communication from the material delivery table to the feeding space and to the conveying arm and, with the conveying arm situated under the material conveying table, communication is open between the material delivery table and the feeding space.

24. The at least one of a conveying device and a press according to claim 23, wherein the pivotable bottom part of the delivery table can be driven within its pivot range by the conveying arm.

25. The at least one of a conveying device and a press according to claim 22, wherein the material delivery table has a table extension extending in the direction toward the feeding space, the table extension being swivelable around a pivot axis extending along a front edge of the delivery table.

26. The at least one of a conveying device and a press according to claim 25, wherein the table extension can be swiveled by contact with one of the conveying arm and the conveying head during pivoting movement of the conveying arm in an area near a rear reversal point of the movement of the conveying arm.

27. The at least one of a conveying device and a press according to claim 25, wherein the table extension has a width, measured parallel to its pivot axis, which is smaller than a distance measured in the same direction between the lever arms of the conveying arm and wherein the table extension in a lower area of its pivot movement extends with its free side between the lever arms and lies on the conveying head.

28. The at least one of a conveying device and a press according to claim 25, wherein the table extension includes one of a bend on the bottom and a curved section pivotable relative to the rest of the table extension, and wherein in an upward swiveled position of the table extension, one of the bottom bend and the curved section continues the bottom bend of the feeding space in the form of a cylindrical outer surface section on an end away from the transfer region in a material return bend bent more tightly in the same direction and extending beyond the vertical.

\* \* \* \* \*